(12) United States Patent
Watanabe et al.

(10) Patent No.: US 10,846,715 B2
(45) Date of Patent: Nov. 24, 2020

(54) ENERGY OPERATION APPARATUS, METHOD, AND SYSTEM

(71) Applicant: HITACHI, LTD., Tokyo (JP)

(72) Inventors: Tohru Watanabe, Tokyo (JP); Isao Hagiya, Tokyo (JP); Masamichi Nakamura, Tokyo (JP); Yu Ikemoto, Tokyo (JP); Masato Utsumi, Tokyo (JP); Masashi Fukaya, Tokyo (JP); Jyunpei Ogawa, Tokyo (JP); Hiroaki Ogawa, Tokyo (JP); Ikuo Shigemori, Tokyo (JP); Hiroshi Iimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/298,326

(22) Filed: Mar. 11, 2019

(65) Prior Publication Data

US 2019/0369572 A1 Dec. 5, 2019

(30) Foreign Application Priority Data

May 31, 2018 (JP) .................................. 2018-105506

(51) Int. Cl.
  *G06Q 30/02* (2012.01)
  *G01W 1/10* (2006.01)
  (Continued)

(52) U.S. Cl.
  CPC .......... *G06Q 30/0202* (2013.01); *G01W 1/10* (2013.01); *G05B 13/048* (2013.01); *G05F 1/66* (2013.01);
  (Continued)

(58) Field of Classification Search
  CPC ............. G06Q 10/04; G06Q 10/06375; G06Q 30/0202; G06Q 50/06; G05B 15/02;
  (Continued)

(56) References Cited

U.S. PATENT DOCUMENTS 8,234,876 B2 * 8/2012 Parsonnet ............. F24F 5/0017
  62/59
8,528,345 B2 * 9/2013 Parsonnet ............. F24F 5/0017
  62/59
(Continued)

FOREIGN PATENT DOCUMENTS

AU    2017239491 A1    5/2018
JP    2015-099417 A    5/2015
(Continued)

OTHER PUBLICATIONS

Extended European Search Report dated Oct. 15, 2019 for the European Patent Application No. 19161960.0.

*Primary Examiner* — Crystal J Barnes-Bullock
(74) *Attorney, Agent, or Firm* — Volpe Koenig

(57) ABSTRACT

An energy operation system, apparatus, and method capable of stably supplying energy and providing adjustment control based on prediction precision and planning precision for energy supply and demand. An energy operation apparatus includes a demand predictor, planner, evaluator, and solution quality controller. The demand predictor predicts demand and/or a power generation amount of future energy in a management area. The planner prepares a future energy supply plan in the management area based on a prediction. The evaluator evaluates supply and/or demand conditions including at least one of future weather in the management area, energy demand in the management area, a demand density and/or a generation density of future energy in the management area. The solution quality controller controls the quality of at least one of a prediction solution of the demand predictor and the energy supply plan of the planner based on an evaluation result from the evaluator.

12 Claims, 19 Drawing Sheets

(51) Int. Cl.
*G05B 13/04* (2006.01)
*H02J 3/12* (2006.01)
*G06Q 10/06* (2012.01)
*G05F 1/66* (2006.01)
*H02J 3/00* (2006.01)

(52) U.S. Cl.
CPC .......... *G06Q 10/06375* (2013.01); *H02J 3/12* (2013.01); *H02J 3/003* (2020.01)

(58) Field of Classification Search
CPC .......... G05B 2219/2642; G05B 13/048; Y04S 10/54; Y04S 10/545; Y04S 20/222; Y04S 20/242; Y04S 50/14; G05F 1/66; H02J 3/003; H02J 3/46; H02J 2203/20; H02J 2310/14; H02J 3/12; Y02B 70/3225; Y02B 70/3266; Y02E 10/563; Y02E 10/566; Y02E 10/763; Y02E 40/76; Y02E 70/30; Y02A 30/12; Y02A 90/15; G01W 1/10
See application file for complete search history.

(56) References Cited

U.S. PATENT DOCUMENTS

| | | | |
|---|---|---|---|
| 8,768,527 B2* | 7/2014 | Tomita | H02J 3/14 700/291 |
| 9,244,444 B2* | 1/2016 | Carty | G05B 15/02 |
| 9,753,947 B2* | 9/2017 | Goering | G06F 16/29 |
| 9,760,956 B2* | 9/2017 | Magnussen | H02J 3/14 |
| 9,852,483 B2* | 12/2017 | Sawa | G06Q 10/04 |
| 10,338,622 B2* | 7/2019 | Nakasone | H02J 7/35 |
| 2008/0033786 A1* | 2/2008 | Boaz | G06Q 10/06375 705/7.31 |
| 2012/0072140 A1* | 3/2012 | Cowan | G06Q 50/06 702/60 |
| 2012/0232701 A1* | 9/2012 | Carty | G05B 15/02 700/277 |
| 2017/0075035 A1 | 3/2017 | Kakimoto et al. | |
| 2019/0202414 A1* | 7/2019 | Shih | B60L 53/68 |

FOREIGN PATENT DOCUMENTS

| | | | |
|---|---|---|---|
| JP | 2017-053804 A | | 3/2017 |
| KR | 20130045006 A | * | 5/2013 |

* cited by examiner

FIG. 7

| TARGET STABILIZATION INDEX | REFERENCE POINT |
|---|---|
| 5 | UPPER-METEOROLOGICAL COMPUTATIONAL GRID |
| 4 | UPPER-METEOROLOGICAL COMPUTATIONAL GRID |
| 3 | GROUND-LEVEL METEOROLOGICAL COMPUTATIONAL GRID |
| 2 | GROUND-LEVEL METEOROLOGICAL COMPUTATIONAL GRID |
| 1 | GROUND-LEVEL METEOROLOGICAL COMPUTATIONAL GRID |

FIG. 8

| TARGET STABILIZATION INDEX | THRESHOLD VALUE | REGRESSION MODEL |
|---|---|---|
| 5 | P>0.9 | LASSO REGRESSION MODEL |
| 4 | P>0.8 | LASSO REGRESSION MODEL |
| 3 | P>0.4 | RIDGE REGRESSION MODEL |
| 2 | P>0.3 | RIDGE REGRESSION MODEL |
| 1 | P>0.2 | RIDGE REGRESSION MODEL |

FIG. 9

| ROLE TAG | TAG VALUE (WEATHER) | TAG VALUE (DEMAND DENSITY) | FIRST PREDICTIVE SOLUTION TARGET STABILIZATION INDEX | SECOND PREDICTIVE SOLUTION TARGET STABILIZATION INDEX | THIRD PREDICTIVE SOLUTION TARGET STABILIZATION INDEX | RELAXATION SOLUTION TARGET STABILIZATION INDEX | LOW-ORDER EM-ORIENTED TARGET STABILIZATION INDEX |
|---|---|---|---|---|---|---|---|
| ADJUSTING THE DEMAND DEVIATION IN AN AREA | LARGE DISTURBANCE | SEVERE | 5 | 5 | 5 | 5 | 5 |
| ADJUSTING THE DEMAND DEVIATION IN AN AREA | LARGE DISTURBANCE | NORMAL | 4 | 3 | 4 | 5 | 4 |
| ADJUSTING THE DEMAND DEVIATION IN AN AREA | LARGE DISTURBANCE | MODERATE | 4 | 2 | 3 | 4 | 3 |
| ADJUSTING THE DEMAND DEVIATION IN AN AREA | SMALL DISTURBANCE | SEVERE | 3 | 4 | 3 | 5 | 3 |
| ADJUSTING THE DEMAND DEVIATION IN AN AREA | SMALL DISTURBANCE | NORMAL | 3 | 3 | 2 | 3 | 2 |
| ADJUSTING THE DEMAND DEVIATION IN AN AREA | SMALL DISTURBANCE | MODERATE | 1 | 1 | 1 | 2 | 1 |

ENERGY OPERATION APPARATUS, METHOD, AND SYSTEM

BACKGROUND

The present invention relates to an energy operation apparatus, its method, and system advantageously applicable to a distributed energy operation system comprised of a plurality of energy operation apparatuses that predict the supply and demand of the energy in respective management areas and operate the energy in the management area based on a prediction result, for example.

An energy operation is performed to satisfy chronologically varying demands for the energy to be supplied. The energy operation includes a prediction of demands, schedule, and control of supplies. Demands for the energy are predicted after various specified times (time slices) such as an hour, two hours, three hours, a day, a week, a month, or a year. The energy demand stochastically varies under the influence of natural phenomena such as temperatures. The power generation associated with the energy supply cannot provide an exact solution due to the influence of wind or sunshine on the energy regeneration, the influence of the intake temperature of cooling water on the thermal power generation, and the influence of thermal value differences in different production regions of coal as fuel. Therefore, the prediction of energy demands and the schedule and control of energy supply need to allow a certain degree of errors.

Japanese Unexamined Patent Application Publication No. 2017-53804 describes the prediction of electric power demands based on data generated by averaging weather prediction data near a spot targeted at predicting the electric power demand. This makes it possible to predict an average electric power demand even when the weather prediction causes a positional error.

Japanese Unexamined Patent Application Publication No. 2015-99417 describes how to find a solution to the energy supply by allowing solutions excluded from the exact solution and using them as candidates for the final solution. This makes it possible to schedule to start or stop the power generator based on a pattern approximate to the exact solution of starting or stopping the power generator despite many restrictions such as demands or the minimum operating time of a power generator.

SUMMARY

However, Japanese Unexamined Patent Application Publication No. 2017-53804 has no concern for providing an appropriate prediction accuracy target suited for an allowable accuracy in scheduling or controlling the energy supply corresponding to a "targeted range" managed by an apparatus for energy operation (hereinafter referred to as an energy operation apparatus). The targeted range signifies a group of energy operation apparatuses 10 cooperating in a region making the demand to be managed as well as a demand to be managed or a group of demands or an energy operation system 1. The targeted range is hereinafter referred to as a management area. Simply predicting an average energy demand makes it difficult to schedule and control the energy supply under rare weather conditions.

Japanese Unexamined Patent Application Publication No. 2015-99417 has no concern for determining an appropriate amount as relaxation in the exact solution with reference to a target of the energy operation apparatus. It is likely that restrictions on the demand are excessively relaxed and the exact solution for the power generation plan is excessively relaxed when energy operation apparatuses cooperate with each other to control or schedule the energy supply.

The related arts disclosed in Japanese Unexamined Patent Application Publication No. 2017-53804 and Japanese Unexamined Patent Application Publication No. 2015-99417 cannot schedule and control the energy supply so as to balance the role of an energy operation apparatus in an energy operation system with the energy demand in a management area for the energy operation apparatus in a distributed system where a plurality of energy operation apparatuses operates in cooperation with each other.

The present invention has been made in consideration of the foregoing. It is an object of the invention to propose an energy operation apparatus and its method and system capable of stably supplying and adjusting or controlling the energy based on prediction accuracy and scheduling accuracy appropriate to situations for the energy supply and demand.

According to the present invention to solve the above-described issue, an energy operation apparatus operates energy in a management area based on a prediction result for supply and/or demand for the energy in the management area. The energy operation apparatus includes a demand predictor, a planner, an evaluator, and a solution quality controller. The demand predictor predicts demand and/or a power generation amount of future energy in a management area. The planner prepares a future energy supply plan in the management area based on a prediction result from the demand predictor. The evaluator evaluates supply and/or demand conditions including at least one of future weather in the management area, energy demand in the management area, a demand density and/or a generation density of future energy in the management area. The solution quality controller controls the quality of at least one of a prediction solution of the demand predictor and the energy supply plan of the planner based on an evaluation result from the evaluator.

According to the present invention, an energy operation method is performed in an energy operation apparatus that performs an operation of the energy in a management area based on a prediction result for at least one of supply and demand for energy in the management area. The energy operation method includes a first step and a second step. The first step predicts a future demand and/or a power generation amount of the energy in the management area. The second step prepares a future energy supply plan in the management area based on a prediction result for at least one of demand and power generation amount of the energy. The first step includes an evaluation step and a solution quality control step. The evaluation step evaluates supply and/or demand conditions including at least one of future weather in the management area, energy demand in the management area, and at least one of a future energy demand density and generation density in the management area. The solution quality control step controls the quality of at least one of a prediction solution and the energy supply plan of at least one of a demand and power generation amount of the energy based on an evaluation result from an evaluation step.

According to the present invention, an energy operation system comprises a plurality of energy operation apparatuses each of which predicts supply and/or demand for energy in a management area and operates the energy in the management area based on a prediction result. Each of the energy operation apparatuses includes a demand predictor, a planner, an evaluator, and a solution quality controller. The demand predictor predicts a future demand and/or a power generation amount of the energy in the management area.

The planner prepares a future energy supply plan in the management area based on a prediction result from the demand predictor. The evaluator evaluates supply and/or demand conditions including at least one of future weather in the management area, energy demand in the management area, and a future energy demand density and/or a generation density in the management area. The solution quality controller controls the quality of a prediction solution of the demand predictor and/or the energy supply plan of the planner based on an evaluation result from the evaluator.

According to the energy operation system, the apparatus, and the method of the present invention, the energy operation apparatus can control the quality of a prediction solution for the demand and/or the power generation amount of future energy in a management area or the quality of an energy supply plan based on supply and/or demand conditions in the management area. Therefore, it is possible to predict the demand and/or the generation amount of energy based on the quality (reliability and exactness) appropriate for the supply and/or demand conditions in the management area.

The present invention can provide an energy operation apparatus and its method and system capable of stably supplying and adjusting or controlling the energy.

BRIEF DESCRIPTION OF THE DRAWINGS

FIG. 7 is a diagram illustrating a configuration of a first table;

FIG. 8 is a diagram illustrating a configuration of a second table;

FIG. 9 is a diagram illustrating a configuration of a third table;

DETAILED DESCRIPTION

Embodiments of the present invention will be described in further detail with reference to the accompanying drawings.

(1) First Embodiment (1-1) Configuration of the Energy Operation System

Figure 1:
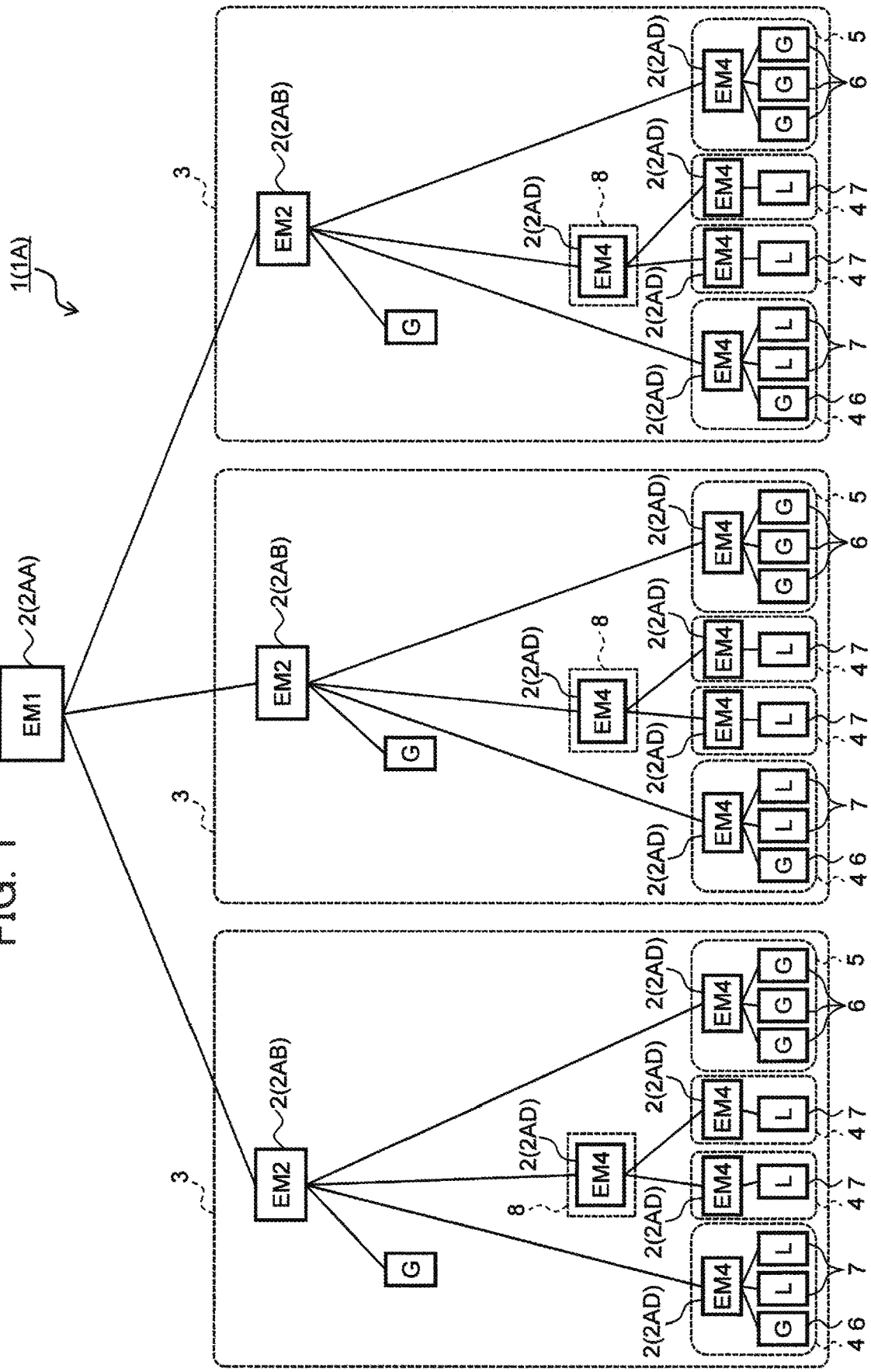
FIG. 1 is a block diagram illustrating a configuration of a distributed energy operation system before liberalization of the energy market.

FIG. 1 illustrates a configuration of an energy operation system 1 (1A). The energy operation system 1 is available as a distributed system in which a plurality of energy operation apparatuses 2 (2AA through 2AD) cooperate to provide control or necessary scheduling for the energy supply.

In FIG. 1, "EM1" (EM: Energy Manager) denotes an energy operation apparatus 2 (2AA) that performs a process to control power interchange among a plurality of electric power companies 3. "EM2" denotes an energy operation apparatus 2 (2AB) installed at a power feeding direction center of each electric power company 3. "EM4" denotes an energy operation apparatus 2 (2AD) as an aggregator 8 or an energy operation apparatus 2 (2AD) installed at each consumer 4 or electric generating station 5. The aggregator 8 provides an energy management service that manages electric power demands from the consumers 4.

Each energy operation apparatus 2 (2AB) transmits a power generation directive or a directive to generate negawatt or posiwatt power to the lower-order energy operation apparatus 2AD based on states of the cooperating energy operation apparatuses 2 (2AD and 2AA) and a power generation plan. The state here signifies a power generation margin and the remaining capacity of an interconnection line to perform power interchange among the electric power companies 3. The power generation plan is previously prepared in the relevant energy operation apparatus 2 (2AB) based on the situation of electric power demands and weather conditions of the moment or the prediction of electric power demands and the weather prediction in the future.

The energy operation apparatus 2AD at the lowest layer is used for each of the consumers 4 or the electric generating stations 5. The energy operation apparatus 2AD drives a power generator 6 or controls operations of a load 7 based on the power generation directive or the directive to generate negawatt or posiwatt power supplied from the higher-order energy operation apparatuses 2AA through 2AC.

For example, the energy operation apparatus 2AD installed at the electric generating station 5 generates the power for the requested electric energy by driving the power generator 6 in a facility based on the power generation directive supplied from the higher-order energy operation apparatus 2AB.

The energy operation apparatus 2AD used for the large-scale consumer 4 including a power generation facility generates the requested electric energy by driving the power generator 6 of the large-scale consumer based on a power generation directive supplied from the higher-order energy operation apparatus 2AB. Moreover, the energy operation apparatus 2AD generates negawatt or posiwatt power by controlling operations of the load in the facility based on the directive to generate negawatt or posiwatt power.

The energy operation apparatus 2AD for the aggregator 8 generates negawatt or posiwatt power based on the directive to generate negawatt or posiwatt power supplied from the higher-order energy operation apparatus 2AB by allowing the energy operation apparatus 2AD installed at the contracted small-scale consumer 4 to control the load 7 owned by the small-scale consumer 4.

Figure 2:
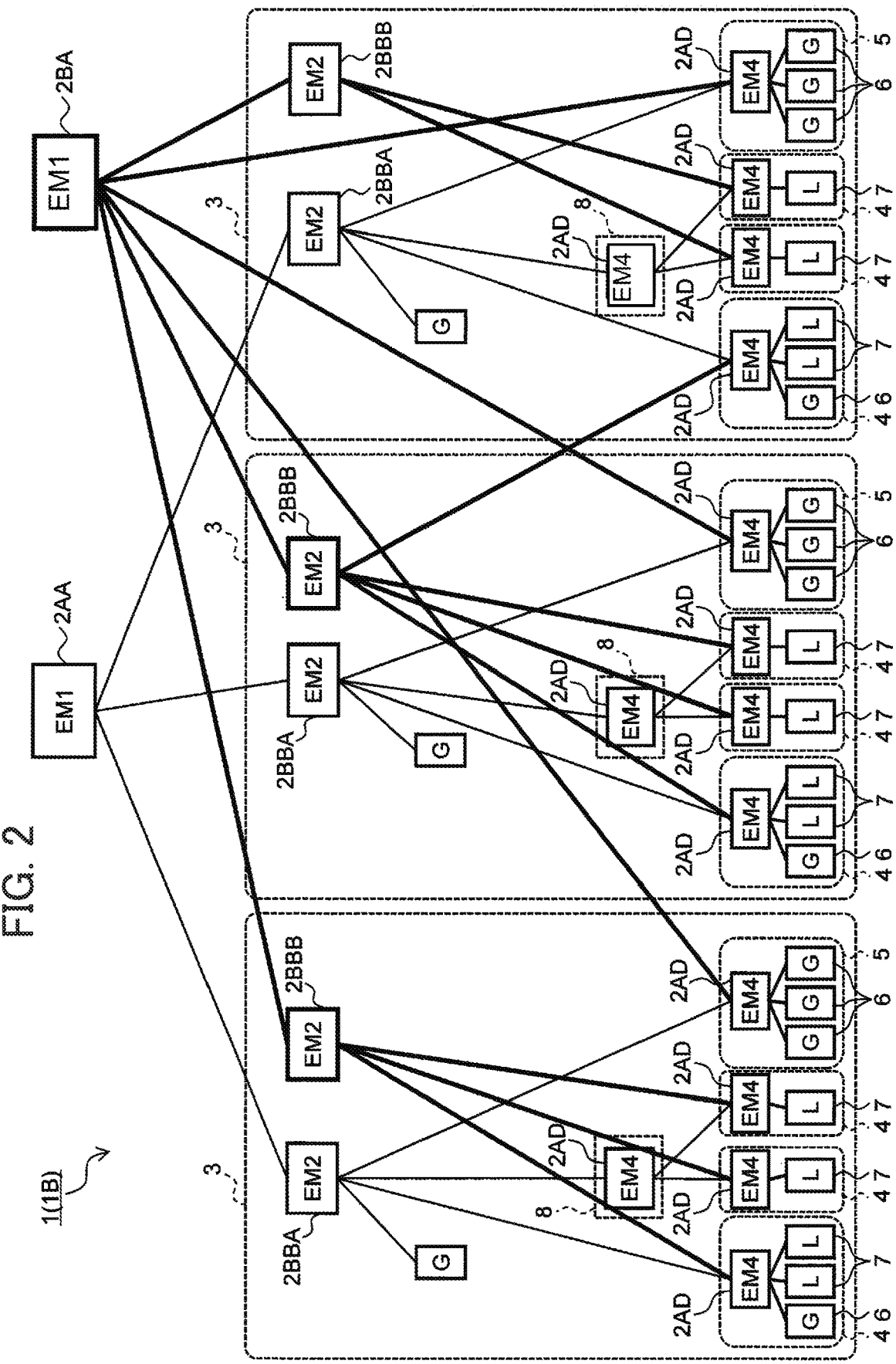
FIG. 2 is a block diagram illustrating a configuration of a distributed energy operation system after liberalization of the energy market.

The mutually corresponding parts in FIGS. 2 and 1 are designated by the same reference numerals. FIG. 2 illustrates an example configuration of the energy operation system 1 (1B) based on the energy market liberalization system aimed at the separation of electric power production from power distribution and transmission. An electric power retailing company to generate and retail the electric power differs from a local electric power transmission company to transmit the electric power.

The liberalization of the energy market liberalizes energy trading, thus establishing a transaction market (hereinafter referred to as an electricity transaction market) 2BA that transacts the electric power as availability. Each electric power company 3 (FIG. 1) is divided into a local electric power transmission company and an electric power retailing company. The electric power company 3 has hitherto owned the energy operation apparatus 2AB (FIG. 1) for the power feeding direction center. The local electric power transmission company inherits the energy operation apparatus 2AB as an energy operation apparatus 2BBA. An electricity transaction market 2BA needs to transact electric power generated by the power generator 6 of the large-scale consumer 4 or posiwatt and negawatt power generated by the small-scale consumer 4. For this purpose, the electric power retailing company newly installs an energy operation apparatus 2BBB. The energy operation apparatus 2BBB is connected to an energy operation apparatus 2AD for the large-scale consumer 4 or the small-scale consumer 4.

Figure 3:
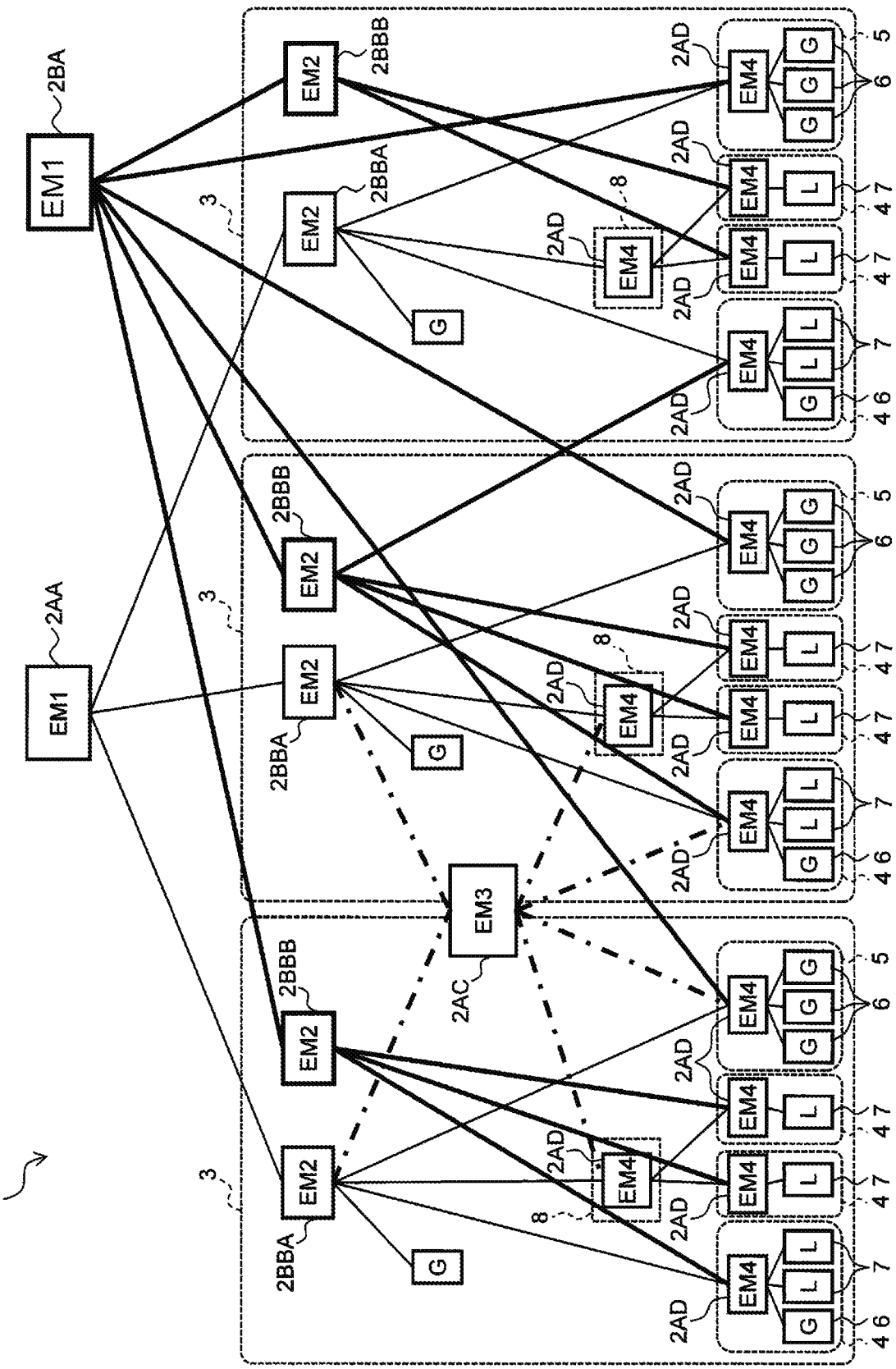
FIG. 3 is a block diagram illustrating a configuration of a distributed energy operation system in the future.
Figure 4:
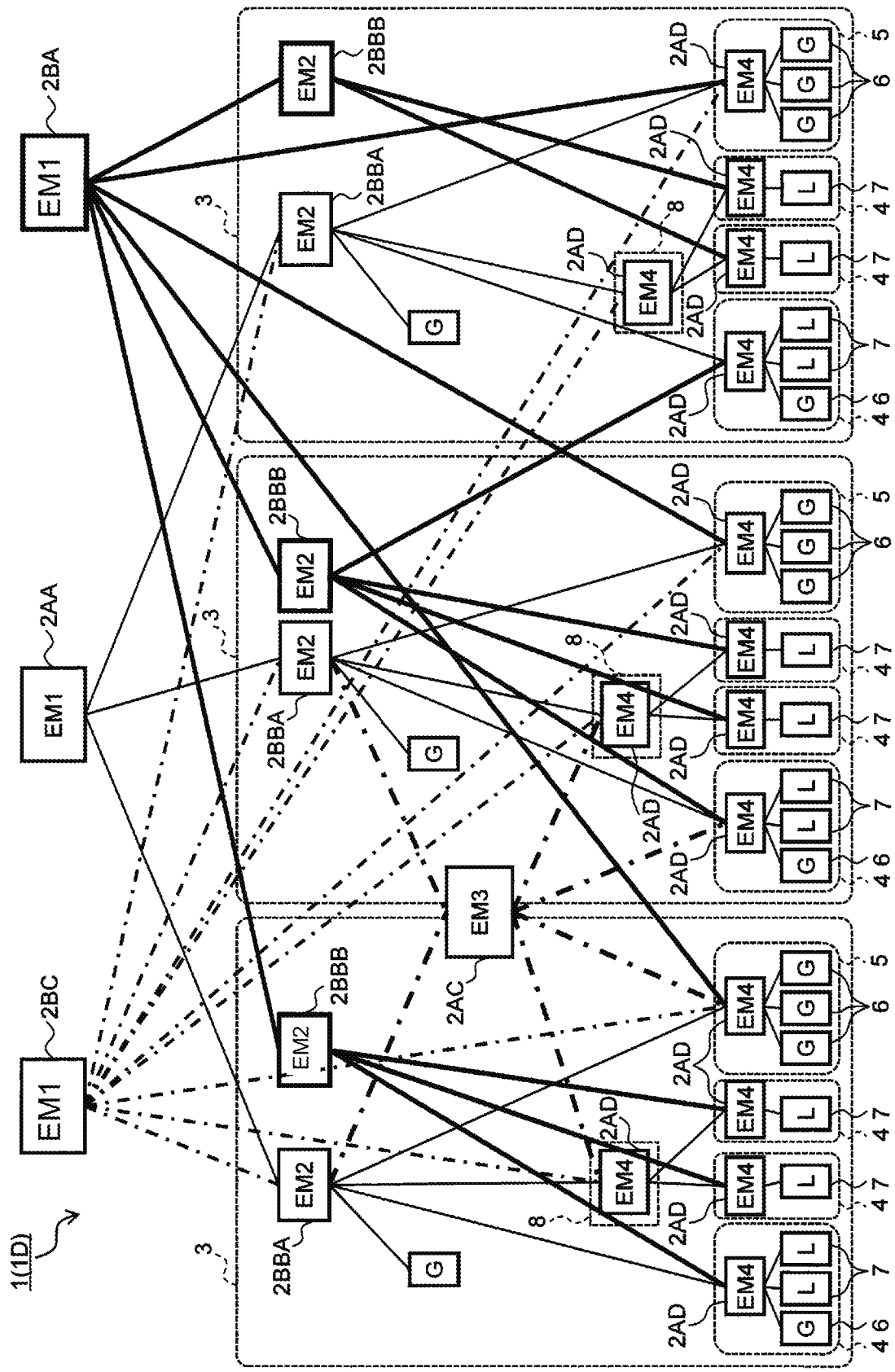
FIG. 4 is a block diagram illustrating a configuration of a distributed energy operation system in the future.

Recently, it is proposed to adjust demands across management ranges of the electric power companies 3. As illustrated in FIG. 3, an energy operation apparatus 2AC may be installed to adjust these demands. The mutually corresponding parts in FIGS. 3 and 2 are designated by the same reference numerals. As illustrated in FIG. 4, an adjusting power transaction market 2CA may be provided to transact the electric power as coordination. The mutually corresponding parts in FIGS. 4 and 3 are designated by the same reference numerals.

As illustrated in FIGS. 1 through 4, the above-described energy operation apparatuses 2AA through 2AD, 2BA, 2BBA, and 2BBB (hereinafter generically referred to as energy operation apparatuses 2) are hierarchized to form the energy operation system 1 (1A through 1D). In the energy operation system 1, the higher-order energy operation apparatus 2 controls the lower-order energy operation apparatus 2. The lowest-order energy operation apparatus controls the power generator 6 or the load 7.

In this hierarchical distributed system, the energy operation apparatus 2 basically needs to increase the accuracy to prepare an energy supply plan as lower orders are targeted. The accuracy of the energy supply plan prepared by each energy operation apparatus 2 also depends on whether the other energy operation apparatuses 2 are cooperating.

The "accuracy" here signifies the degree of coincidence between a calculation output value and a true value in the meaning of trueness and precision inclusively. The "trueness" signifies the degree of smallness of a difference between an expected calculation output value and a true value. The "precision" signifies smallness of the variability in discrete calculation output values. The predictive calculation does not always cause a true calculation output value (predicted value) and a precise calculation output value (predicted value) simultaneously.

It is favorable that the energy operation apparatus 2 increases the precision toward lower orders and increases the trueness toward higher orders. Meanwhile, it is favorable that the energy operation apparatus increases the trueness toward lower orders and increases the precision toward higher orders. The energy operation apparatuses 2 having different objectives such as the trueness and the precision (also described as exactitude or exactness) cooperate with each other, thus making it possible to predict and plan to supply the energy excellent in the accuracy (also described as system precision or simply as precision).

The energy demand in a management area for each energy operation apparatus 2 depends on a weather situation in the management area and an energy supply and demand situation. The energy supply and demand situation includes energy demand density and power generation density. The energy demand density signifies the traffic per unit area, the actual communication traffic per unit area, or the amount of demanded energy per unit area correlated with the number of workers in all industries. The power generation density is correlated with the number of installed solar power generation devices per unit area and each generation capacity, the number of installed cogeneration systems (electric heat supply apparatuses) and each generation capacity, and the number of installed power generators and each generation capacity. It is necessary to plan to supply the energy in consideration of these.

The energy operation apparatus 2 according to the present embodiment is characterized by preparing an energy supply plan in a management area of the relevant energy operation apparatus 2 based on its role in the energy operation system 1 and based on a weather situation and an energy demand situation in its management area. The description below explains the energy operation apparatus 2 according to the present embodiment.

(1-2) Configuration of the Energy Operation Apparatus the Present Embodiment

Figure 5:
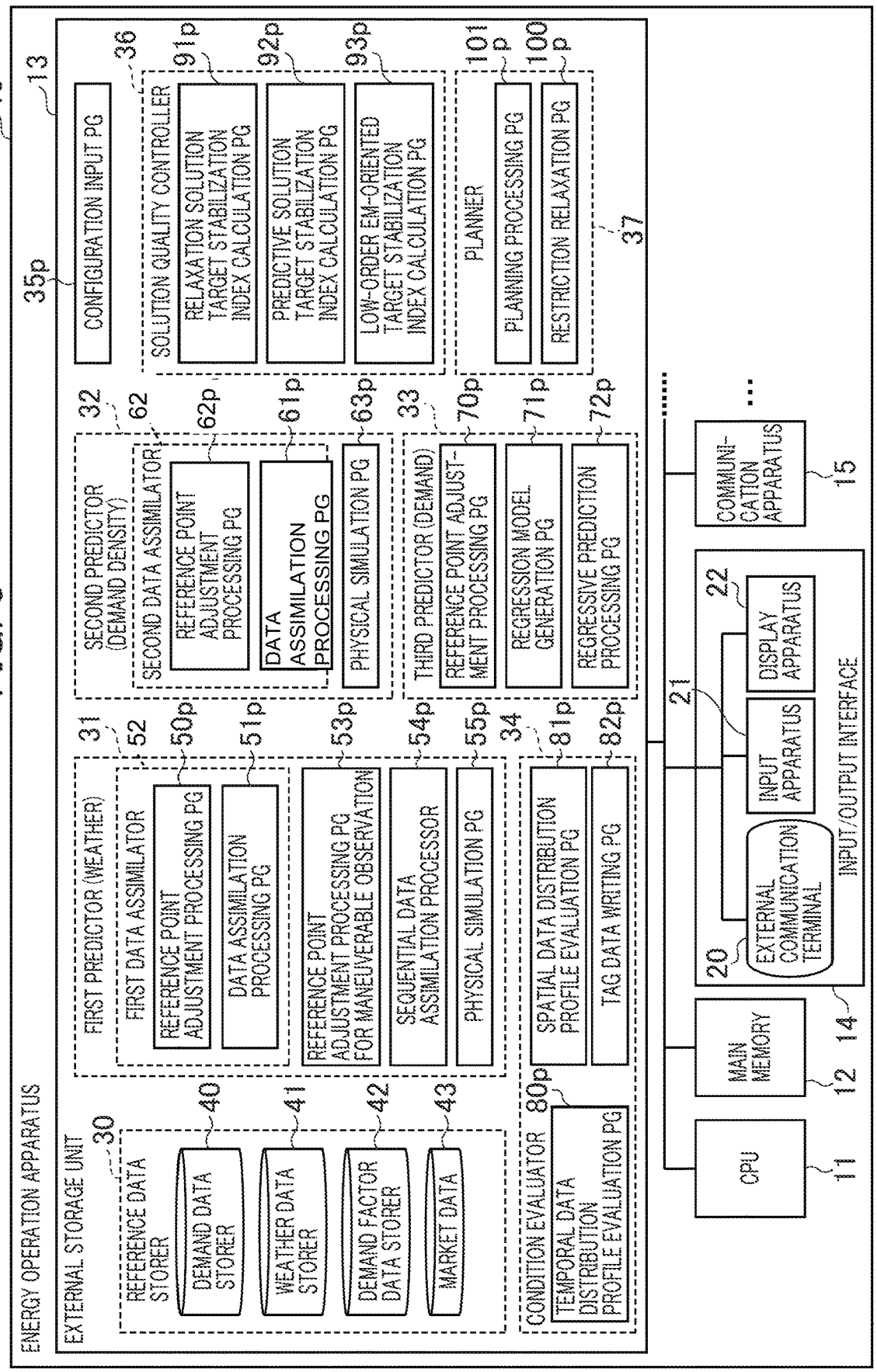
FIG. 5 is a block diagram illustrating a hardware configuration of an energy operation apparatus according to a first embodiment.

FIG. 5 illustrates a configuration of the energy operation apparatus 10 according to the present embodiment used as the energy operation apparatus 2 in FIG. 4. The energy operation apparatus 10 includes a CPU (Central Processing Unit) 11, a main memory 12, an external storage unit 13, an input/output interface 14, and a plurality of communication apparatuses 15.

The CPU 11 is provided as a processor to control an overall operation of the energy operation apparatus 10. The main memory 12 is provided as a volatile semiconductor memory, for example, and is used as a work memory for the CPU 11.

The external storage unit 13 is provided as a large-capacity nonvolatile storage unit such as a hard disk drive or an SSD (Solid-State Drive) and stores various programs and data for a long time period. The external storage unit 13 also stores and maintains programs (reference point adjustment processing program 70$p$, regression model generation program 71$p$, regressive prediction processing program 72$p$) that configure a reference data storer 30, first through third predictors 31 through 33, a condition evaluator 34, a configuration inputter 35, a solution quality controller 36, and a planner 37 to be described later.

A program stored in the external storage unit 13 loaded into the main memory 12 as needed or when the energy operation apparatus 10 starts. The CPU 11 executes the loaded program to perform various processes for the energy operation apparatus as a whole as described later.

The input/output interface 14 includes an external communication terminal 20, an input apparatus 21, and a display apparatus 22. The external communication terminal 20 is provided as a USB (Universal Serial Bus) terminal, for example. The input apparatus 21 is provided as a keyboard, a mouse, or a touch-pad. A user uses the input apparatus 21 to input necessary information. The display apparatus 22 is provided as a liquid crystal panel or an organic EL (Electro Luminescence) panel, for example, and displays necessary screen-views or information.

The communication apparatus 15 controls protocols when the energy operation apparatus 10 communicates with the other energy operation apparatuses 10 or servers, load facilities, and/or power generating facilities of government offices, companies, and organizations that provide energy information services such as weather information or traffic information.

Figure 6:
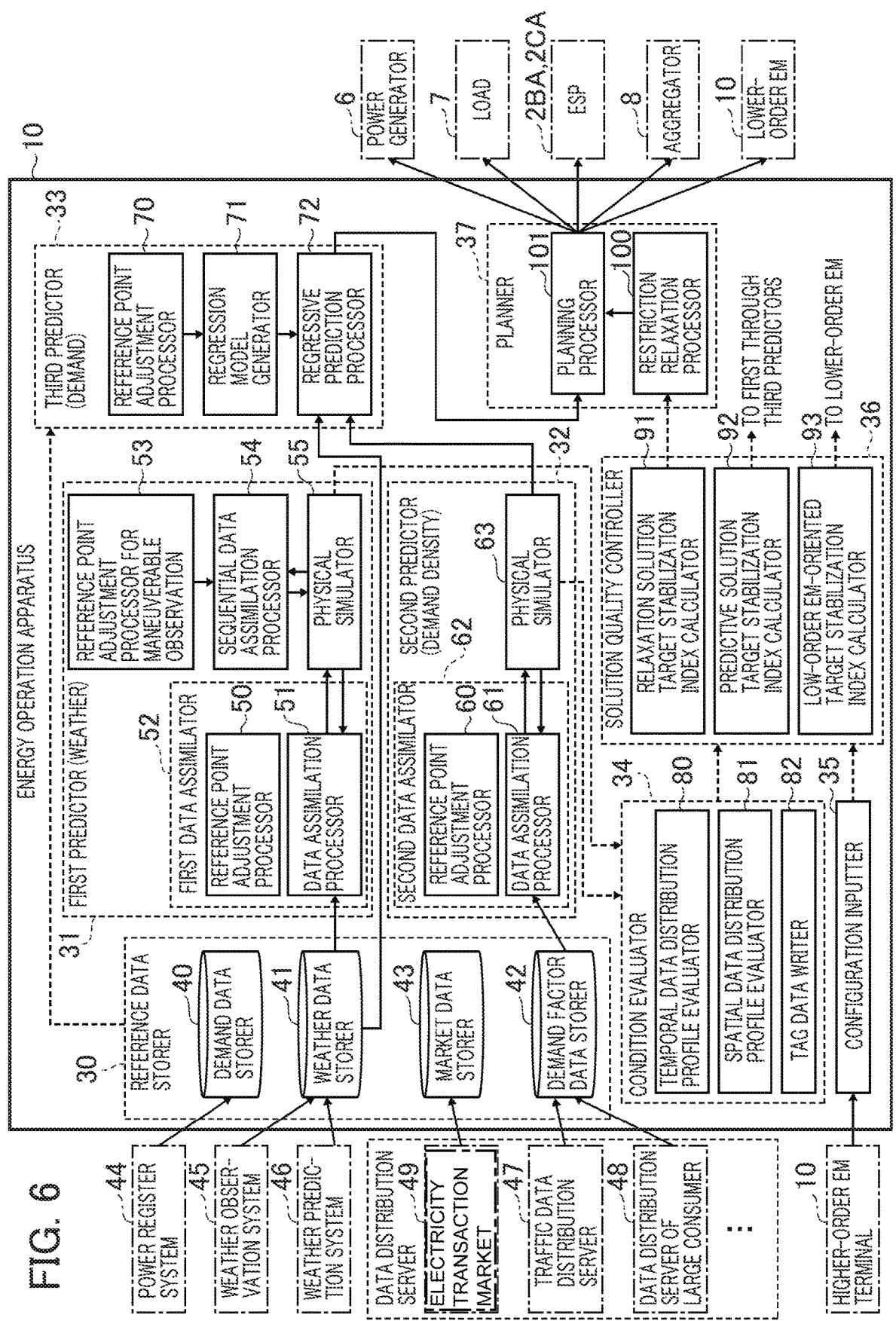
FIG. 6 is a block diagram illustrating a logical configuration of the energy operation apparatus according to the first embodiment.

FIG. 6 illustrates a logical configuration of the energy operation apparatus 10. As illustrated in FIG. 6, the energy operation apparatus 10 includes the reference data storer 30, a first predictor 31, a second predictor 32, a third predictor 33, the condition evaluator 34, the configuration inputter 35, the solution quality controller 36, and the planner 37.

The reference data storer 30 is configured as a storage area that forms part of the main memory 12 or the external storage unit 13. The reference data storer 30 includes a demand data storer 40, a weather data storer 41, a demand factor data storer 42, and a market data storer 43.

The demand data storer 40 provides a database that stores past energy demands in a management area for the relevant energy operation apparatus 10. The demand data storer 40 successively stores demand data, namely, the power consumption for each consumer periodically acquired from a power register system 44 for the consumer in the management area.

The weather data storer 41 provides a database that stores past observation data (weather data) comprised of weather elements such as temperature, solar radiation, humidity, wind speed, wind direction, and atmospheric pressure. The weather data storer 41 successively stores observation data and forecast data (weather prediction data). The observation data includes weather elements for each meteorological computational grid periodically acquired from a weather observation system 45 of the meteorological agency or non-governmental weather service. The weather prediction data includes weather elements for each meteorological computational grid periodically acquired from a weather prediction system 46 of the meteorological agency or non-governmental weather service. The "meteorological computational grid" represents points provided at a specified interval in the latitudinal direction, the longitudinal direction, and the vertical direction on the ground surface and in the space from the ground surface to the sky at a specified height.

The demand factor data storer 42 provides a database that stores observation values concerning factors (hereinafter referred to as demand factors) of an electric power demand such as road traffic in a management area of the energy operation apparatus 10, actual communication traffic, the number of industrial workers, and the number of railroad passengers. The demand factor data storer 42 successively stores observation values concerning the demand factors. For example, the observation values are related to the road traffic in a management area of the relevant energy operation apparatus 10 and are periodically acquired from a traffic data distribution server 47 for a road travel bureau. The observation values also correspond to the actual communication traffic for each large consumer periodically acquired from a data distribution server 48 of the large consumer.

The market data storer 43 provides a database that stores transaction information in the electricity transaction market 49. The market data storer stores market data corresponding to information such as bidding information or unit prices of the electric power in the electricity transaction market 49.

The first predictor 31 is provided as a functional part having the function of performing the weather prediction in a management area for the relevant energy operation apparatus 10 based on the quality specified from the solution quality controller 36 as will be described later. The first predictor 31 includes a first data assimilator 52, a reference point adjustment processor for maneuverable observation 53, a sequential data assimilation processor 54, and a physical simulator 55. The first data assimilator 52 includes a reference point adjustment processor 50 and a data assimilation processor 51.

The reference point adjustment processor 50 of the first data assimilator 52 is a functional part that is implemented when the CPU 11 executes a corresponding reference point adjustment processing program 50P (FIG. 5) stored in the external storage unit 13 (FIG. 5). The reference point adjustment processor 50 identifies, as a reference point, a meteorological computational grid to be focused in a data assimilation process. As will be described later, the data assimilation processor 51 performs the data assimilation process in order to perform the weather prediction in a management area based on the quality specified by the solution quality controller 36.

Actually, the first predictor 31 is notified of the quality from the solution quality controller 36. The quality is hereinafter referred to as a predictive solution target stabilization index in the form of a numeric value ranging from 1 through 5 to represent the stability of a predicted result as a target of the energy operation apparatus 10 to be described later. As illustrated in FIG. 7, the first predictor 31 maintains a first table 56. A user previously defines the first table 56 so that each value of the predictive solution target stabilization index can identify a meteorological computational grid as reference point corresponding to a predetermined altitude.

Suppose the meteorological computational grid exists in a management area for the relevant energy operation apparatus 10 and is defined in the first table 56 corresponding to the value of a predictive solution target stabilization index supplied from the solution quality controller 36. In FIG. 7, the meteorological computational grid is denoted as "upper-meteorological computational grid" belonging to the upper atmosphere or as "ground-level meteorological computational grid" belonging to the ground level. The reference point adjustment processor 50 identifies this meteorological computational grid as the reference point and notifies it to the data assimilation processor 51.

When using weather data acquired near the ground level, the weather prediction normally produces a highly accurate prediction result because the weather data is directly measured on the ground level. However, the prediction result is unstable or is highly circumstantial because the solar radiation, atmospheric pressure, wind direction, and air volume are unstable near the ground level. When using weather data acquired in the upper air, the weather prediction produces a stable or less circumstantial prediction result because the temperature, atmospheric pressure, wind direction, and air volume are stable in the upper air. However, the acquired prediction result is less precise. In the first table 56, therefore, the predictive solution target stabilization index assigned a larger value (higher stability quality) corresponds to the meteorological computational grid in the upper atmosphere where weather conditions are stable. The predictive solution target stabilization index assigned a smaller value (higher precision in place of low stability quality of a solution) corresponds to the meteorological computational grid near the ground level where a highly precise prediction result is available.

The data assimilation processor 51 of the first data assimilator 52 is a functional part that is implemented when the CPU 11 (FIG. 5) executes a corresponding data assimilation processing program 51P (FIG. 5) stored in the external storage unit 13. The reference point adjustment processor 50 determines observation data (weather data) that emphasizes the reference point. As will be described later, the physical simulator 55 performs a physical simulation to provide simulation result data. The data assimilation processor 51 performs a process that assimilates the observation data with the simulation result data.

Actually, the data assimilation processor 51 performs a data assimilation process. The data assimilation process reads weather data at each of the above-described reference points from the weather data storer 41. The data assimilation process assimilates the weather data with the simulation result from the physical simulator 55 by emphasizing the reference point determined by the reference point adjustment processor 50. It is possible to reproduce the past based on the weather data and estimate (predict) values in the future time slice.

The reference point adjustment processor for maneuverable observation 53 is a functional part that is implemented when the CPU 11 executes a corresponding reference point adjustment processing program for maneuverable observation 53P (FIG. 5) stored in the external storage unit 13 (FIG. 5). As will be described later, the physical simulator 55 generates a simulation model based on the current weather data acquired from the maneuverable observation using a weather balloon or an observation radar. The reference point adjustment processor for maneuverable observation 53 determines a reference point to correct the simulation model. The sequential data assimilation processor 54 performs the data assimilation process in order to perform the weather prediction in a management area based on the quality specified by the solution quality controller 36. Similarly to the reference point adjustment processor 50, the reference point adjustment processor for maneuverable observation determines a reference point to be emphasized in the data assimilation process from the meteorological computational grids from which the current weather data is acquired.

The sequential data assimilation processor 54 is a functional part that is implemented when the CPU 11 executes a sequential data assimilation processing program 54P (FIG. 5) stored in the external storage unit 13. The reference point adjustment processor for maneuverable observation 53 determines meteorological computational grids as reference points. The sequential data assimilation processor 54 performs a data assimilation process that assimilates weather data for each meteorological computational grid with data acquired from a physical simulation of the physical simulator 55 by emphasizing the reference point determined by the reference point adjustment processor for maneuverable observation 53.

The physical simulator 55 is a functional part that is implemented when the CPU 11 executes a physical simulation program 55P (FIG. 5) stored in the external storage unit 13. The physical simulator 55 performs physical simulation (numerical simulation) on the weather elements at the reference points based on weather data, namely, weather data at the reference points supplied from the data assimilation processor 51 of the first data assimilator 52 and current weather data at the reference points supplied from the sequential data assimilation processor 54.

Specifically, the physical simulator 55 estimates changes in the environmental temperature or the amount of water vapor in every very short time based on the thermodynamic equation for the atmosphere comprised of gas and water vapor and the motion equation for mass conservation and energy conservation of the atmosphere and values of the weather elements such as solar radiation on the ground level by performing the simulation of a meteorological system using the radiation energy from the sun as input. The physical simulator 55 outputs a simulation result of the physical simulation to the condition evaluator 34.

For example, suppose the solution quality controller 36 supplies predictive solution target stabilization index "4." In this case, the reference point adjustment processor 50 determines the "upper-meteorological computational grid" as a reference point as above. The first predictor 31 configured as above performs the weather prediction based on the weather data acquired from aircraft observation, radar observation, or balloon observation concerning the "upper-meteorological computational grids." However, some of the "upper-meteorological computational grids" may lack weather data that is then replaced by weather data observed in surrounding meteorological computational grids on the ground.

An alternative is achieved by using the Kalman filter as an observer to estimate a value for the upper-meteorological computational grid from the weather data observed on the ground or using a value estimated by physical simulation on a local meteorological computational grid. This makes it possible to perform stable prediction using the physical simulation in the upper atmosphere assumed to be atmospherically and physically stable and acquire predicted values based on relatively true approximation despite unstable atmospheric and physical phenomena. This is because favorably precise physical simulation can be performed by estimating weather data for the upper-meteorological computational grid when a physical simulation is applied to the weather in a large space region based on a large temporal granularity.

For example, suppose the solution quality controller 36 supplies predictive solution target stabilization index "1." In this case, the first predictor 31 uses weather data for the "ground-level meteorological computational grid." The first predictor 31 can thereby observe a short time interval (small temporal granularity) shorter than 30 minutes and details (small spatial granularity) of a management area for the relevant energy operation apparatus 10 and is capable of highly exact prediction using the physical simulation. An atmospherically and physically stable phenomenon provides a truer predicted value.

The second predictor 32 is a functional part having the function that predicts the data demand density in a management area for the relevant energy operation apparatus 10 according to the quality specified by the solution quality controller 36 to be described later. The quality signifies the prediction stability corresponding to a value of the predictive solution target stabilization index supplied from the solution quality controller 36 to be described later. The second predictor 32 includes a second data assimilator 62 and a physical simulator 63. The second data assimilator 62 includes a reference point adjustment processor 60 and a data assimilation processor 61.

The reference point adjustment processor 60 of the second data assimilator 62 is a functional part that is implemented when the CPU 11 executes a reference point adjustment processing program 62P (FIG. 5) stored in the external storage unit 13. The energy demand density in a management area needs to be predicted based on the quality (predication stability) corresponding to a value of the predictive solution target stabilization index notified from the solution quality controller 36. To do this, the reference point adjustment processor 60 determines a reference point to be emphasized in the data assimilation process performed by the data assimilation processor 61 to be described later.

Specifically, the reference point adjustment processor 62 determines several spots as reference points on the ground level in a management area for the relevant energy operation apparatus 10. To do this, the temporal granularity and the spatial granularity are increased correspondingly to an increase in the value of the predictive solution target stabilization index notified from the solution quality controller 36. The temporal granularity and the spatial granularity are decreased correspondingly to a decrease in the value of the predictive solution target stabilization index. The reference point adjustment processor 62 notifies the data assimilation processor 61 of the spot determined as the reference point.

The data assimilation processor 61 is a functional part that is implemented when the CPU 11 executes a data assimilation processing program 61P (FIG. 5) stored in the external storage unit 13. Similarly to the data assimilation processor 51 of the first predictor 31, the data assimilation processor 61 performs a data assimilation process that assimilates data for the energy demand density with data for a simulation result from the physical simulation. The energy demand density is based on observation data for the corresponding demand factor stored in the demand factor data storer 42. The physical simulation is performed by the physical simulator 63 as described later.

Actually, the data assimilation processor 61 performs a data assimilation process. From the demand factor data storer 42, the data assimilation process reads an observation value for each demand factor at each of the above-described spots determined by the reference point adjustment processor 60. The data assimilation process uses observation values for these demand factors and simulation results from the physical simulation performed by the physical simulator 63 for each demand factor. The data assimilation process thereby reproduces the past from the observation value for each demand factor and estimates (predicts) values in the future time slice.

The physical simulator 63 is a functional part that is implemented when the CPU 11 executes a physical simulation program 63P (FIG. 5) stored in the external storage unit 13. The data assimilation processor 61 supplies the observation value for each demand factor at each reference point on condition that the data assimilation process is applied to the observation value. Based on the observation value, the physical simulator 63 performs numerical simulation of the energy demand density at each of the reference points for each demand factor. The numerical simulation is comparable to the multi-agent simulation or the simulation that simulates fluid using a demand factor. The physical simulator 63 outputs a simulation result from the numerical simulation to the third predictor 33 and the condition evaluator 34.

The third predictor 33 is a functional part having the function that predicts the energy demand in a management area for the relevant energy operation apparatus 10 according to the quality specified by the solution quality controller 36 to be described later based on demand data stored in the demand data storer 40, weather data stored in the weather data storer 41, observation data for demand factors stored in the demand factor data storer 42, necessary market data stored in the market data storer 43, and the energy demand density in the management area predicted by the second predictor 32. The quality signifies the prediction stability corresponding to a value of the predictive solution target stabilization index supplied from the solution quality controller 36 to be described later. The third predictor 33 includes a reference point adjustment processor 70 (configured from the reference point adjustment processing program 70p), a regression model generator 71 (configured from the regression model generation program 71p), and a regressive prediction processor 72 (configured from the regressive prediction processing program 72p).

The reference point adjustment processor 70 is a functional part that is implemented when the CPU 11 executes a reference point adjustment processing program 70P (FIG. 5) stored in the external storage unit 13. The reference point adjustment processor 70 selects the type and the condition of a regression model to be generated by the regression model generator 71 in order to predict the energy demand in a management area for the relevant energy operation apparatus 10 according to the quality corresponding to the value of the predictive solution target stabilization index specified by the solution quality controller 36 as needed.

Actually, the reference point adjustment processor 70 maintains a second table 73 as illustrated in FIG. 8. The second table 73 defines types of the regression model to be generated by the regression model generator 71 and conditions of an explanatory variable (each weather element, each demand factor, and/or data demand density) used for the regression model corresponding to values of the predictive solution target stabilization index specified by the solution quality controller 36. A user previously creates the second table 73. In this case, the condition of the explanatory variable used for the regression model is provided as a threshold value (the "threshold" column in FIG. 8) of priority P for the explanatory variable.

The regression model is defined in the second table 73 correspondingly to the value of the predictive solution target stabilization index specified by the solution quality controller 36. The condition of the explanatory variable corresponds to the priority value of the explanatory variable. The reference point adjustment processor 70 selects and outputs the regression model and the condition of the explanatory variable used for the regression model to the regression model generator 71.

The regression model generator 71 generates a regression model between the energy demand in a management area for the relevant energy operation apparatus 10 and the explanatory variable based on the regression model type supplied from the reference point adjustment processor 70 and the condition of the explanatory variable used for the regression model. The regression model generator 71 outputs the generated regression model to the regressive prediction processor 72.

Specifically, the regression model generator 71 uses the generally known Random forest algorithm to calculate indexes of priority P for each of weather elements, demand factors, and data demand densities available as explanatory variables and normalizes the indexes to 0 through 1. Suppose the normalized value of priority P for each of the weather elements, the demand factors, and the data demand densities satisfies "the condition of the explanatory variable used for the regression model" notified from the reference point adjustment processor 70. Then, the regression model generator 71 uses these weather elements, demand factors, and data demand densities as explanatory variables to generate the regression model notified from the reference point adjustment processor 70.

Suppose an explanatory variable is provided for each of spots for weather observation stations (such as Tokyo, Maebashi, and Yokohama) or unit surfaces (provided for meteorological computational grids, for example) to manage demands. A process to decrease explanatory variables may aggregate data for a plurality of spots (or unit surfaces) into one piece of data as a weighted mean. The weighted mean is generated by using the demand density calculated by the second predictor or the power generation density as a weight coefficient. Thus, aggregating data more reliably produces an average prediction result.

For example, suppose the solution quality controller 36 supplies predictive solution target stabilization index "5." This generates a "Lasso regression model" having explanatory variables represented by the weather element, the demand factor, and/or the data demand density whose normalized priority P is "0.9" or more. Thus, limiting the explanatory variables of a regression model can appropriately simplify the regression model to be generated. The use of the regression model having a small number of simplified explanatory variables can stably predict an energy demand.

Suppose the solution quality controller 36 supplies predictive solution target stabilization index "1." This generates an exact "Ridge regression model" having many explanatory variables represented by the weather element, the demand factor, and the data demand density whose normalized priority P is "0.2" or more. This can precisely predict an energy demand. In particular, a highly precise predicted value is available when the weather or a demand factor fits in a normal range and the prediction using the regression model is easily performed.

In the second table 73, increasing the value of the predictive solution target stabilization index or increasing the quality specifies a simpler regression model and increases a threshold value for priority P of the explanatory variable. Decreasing the value of the predictive solution target stabilization index or decreasing the quality specifies a more complex regression model and decreases a threshold value for priority P of the explanatory variable.

The regressive prediction processor 72 is a functional part that is implemented when the CPU 11 executes a regressive prediction processing program 72P (FIG. 5) stored in the external storage unit 13. The regressive prediction processor 72 acquires a value of the necessary explanatory variable from the weather data storer 41, the demand factor data storer 42, and a simulation result from the physical simulator 63 of the second predictor 32. The regressive prediction processor 72 calculates a predicted value for the energy demand at the time slice (specified time) in a management area for the relevant energy operation apparatus 10 so as to apply the acquired value to the regression model supplied from the regression model generator 71. The regressive prediction processor 72 outputs the calculated predicted value for the energy demand to a planning processor 101 of the planner 37 to be described later.

The regressive prediction processor 72 the present embodiment may be replaced by time-series prediction, similar-date prediction using past actual demands under conditions of similar calendar days and weather, or demand pattern prediction using patterns of demand transition during a specified period such as one day or one week for similar-dated candidates. For example, the time-series prediction can perform stable prediction by widening a sampling interval and ignore variations (fringes) in a minute demand. The similar-date prediction can adjust the number of instances reflecting holidays or weather conditions in calendar days, decrease the number of instances for stable prediction, and thereby use the predicted value corresponding to an average value approximate to the past record.

The condition evaluator 34 is a functional part having the function that evaluates data distribution profiles for each time slice and space slice corresponding to each of simulation results performed by the physical simulators 55 and 63 of the first and second predictors 31 and 32. The condition evaluator 34 includes a temporal data distribution profile evaluator 80, a spatial data distribution profile evaluator 81, and a tag data writer 82.

The temporal data distribution profile evaluator 80 is a functional part that is implemented when the CPU 11 executes a temporal data distribution profile evaluation program 80P (FIG. 5) stored in the external storage unit 13. The physical simulator 55 of the first predictor 31 performs the physical simulation to provide simulation results that are used as prediction results of weather data at reference points. The temporal data distribution profile evaluator 80 uses, for example, a dispersion state (dispersion value) of the predicted values to evaluate the magnitude of the temporal change in the prediction results and calculate a weighted average.

The spatial data distribution profile evaluator 81 is a functional part that is implemented when the CPU 11 executes a spatial data distribution profile evaluation program 81P (FIG. 5) stored in the external storage unit 13. The physical simulators 55 and 63 of the first and second predictors 31 and 32 perform the physical simulation to provide prediction results at the reference points. Based on the prediction results, the spatial data distribution profile evaluator 81 uses a dispersion state (dispersion value) of predicted values at the same time slice to evaluate the change in the predicted values between the reference points on the same plane parallel to the horizontal direction or the vertical direction.

The tag data writer 82 is a functional part that is implemented when the CPU 11 executes a tag data writing program 82P (FIG. 5) stored in the external storage unit 13. The tag data writer 82 determines the stability of a weather condition and an energy demand density condition based on an evaluation result (dispersion value) of the temporal data distribution profile evaluator 80 and an evaluation result (dispersion value) of the spatial data distribution profile evaluator 81. The weather condition signifies a situation of future weather acquired from the physical simulation performed by the physical simulator 55 of the first predictor 31. The energy demand density condition signifies a situation of future energy demand density acquired from the physical simulation performed by the physical simulator 63 of the second predictor 32.

Actually, the tag data writer 82 compares an evaluation result (dispersion value) from the temporal data distribution profile evaluator 80 and an evaluation result (dispersion value) from the spatial data distribution profile evaluator 81 with respective predetermined threshold values. The tag data writer 82 thereby determines whether a weather condition or an energy demand density condition in the future is stable (small dispersion) or unstable (large dispersion). The tag data writer 82 writes a determination result to a specified storage area in the external storage unit 13, for example.

According to the present embodiment, tag values representing the stability of the weather condition include "small disturbance" corresponding to being stable and "large disturbance" corresponding to being unstable. Tag values representing the stability of the energy demand density condition include "moderate" corresponding to being stable, "severe" corresponding to being unstable, and "normal" corresponding to being intermediate between being stable and unstable.

The configuration inputter 35 is a functional part that is implemented when the CPU 11 executes a configuration input program 35P (FIG. 5) stored in the external storage unit 13. The configuration inputter 35 acquires a low-order EM-oriented target stabilization index (to be described) that is notified from the higher-order cooperating energy operation apparatus 10 or is configured by a user using the input apparatus 21 (FIG. 5) of the input/output interface 14 (FIG. 5). The configuration inputter 35 outputs the acquired low-order EM-oriented target stabilization index to the solution quality controller 36.

The solution quality controller 36 is provided as a functional part having the function of controlling the quality of solutions from the simulations such as the physical simulation or the predicted value simulation based on the regression models in the first through third predictors 31 through 33; and simulation of approximate solutions for a programming problem such as the internal point method or simulation of control calculation performed in the planner 37 to be described later.

The solution quality controller 36 acquires a relaxation solution target stabilization index (to be described), the predictive solution target stabilization indexes corresponding to the above-described first through third predictors 31 through 33, and the above-described low-order EM-oriented target stabilization index supplied to the lower-order energy operation apparatus 10 based on tag values of the weather condition and the data demand density condition; the low-order EM-oriented target stabilization index supplied from the configuration inputter 35; and a third table 90 illustrated in FIG. 9, respectively. The tag data writer 82 of the condition evaluator 34 writes the above-described tag values to a specified area in the external storage unit 13. The solution quality controller 36 outputs the acquired target stabilization indexes to the planner 37, the first through third predictors 31 through 33, and the lower-order energy operation apparatus 10.

The third table 90 will be described. The third table 90 is used to manage the above-described relaxation solution target stabilization index, the predictive solution target stabilization indexes to the third through third predictors 31 through 33, and the low-order EM-oriented target stabilization index. These indexes are predetermined for condition tag value combination patterns, namely, combination patterns of tag values for the weather condition and the energy demand density condition. A user previously creates a special version of the third table 90 corresponding to the energy operation apparatus 10.

As illustrated in FIG. 9, the third table 90 includes a role tag column 90A, a weather condition evaluation tag value column 90B, an energy demand density condition evaluation tag value column 90C, a first predictive solution target stabilization index column 90D, a second predictive solution target stabilization index column 90E, a third predictive solution target stabilization index column 90F, a relaxation solution target stabilization index column 90G, and a low-order EM-oriented target stabilization index column 90H. The third table 90 allows one row to correspond to one condition tag value combination pattern and includes the same number of rows as the number of all the condition tag value combination patterns.

The role tag column 90A stores the role of the energy operation apparatus 10 in the energy operation system 1 as a whole. The weather condition evaluation tag value column 90B and the energy demand density condition evaluation tag value column 90C store tag values for the weather condition and the energy demand density condition in the corresponding condition tag value combination patterns, respectively.

The first predictive solution target stabilization index column 90D, the second predictive solution target stabilization index column 90E, and the third predictive solution target stabilization index column 90F store predictive solution target stabilization indexes corresponding to the first through third predictors 31 through 33 predetermined for the corresponding to condition tag value combination patterns, respectively. The relaxation solution target stabilization index column 90G stores relaxation solution target stabilization indexes predetermined for the corresponding condition tag value combination patterns. The low-order EM-oriented target stabilization index column 90H stores low-order EM-oriented target stabilization indexes predetermined for the corresponding condition tag value combination patterns.

In FIG. 9, pay attention to the condition tag value combination pattern containing "large disturbance" as a tag value for the weather condition and "normal" as a tag value for the energy demand density condition. In this example, the predictive solution target stabilization indexes for the first through third predictors 31 through 33 are set to "4," "3," and "4," respectively. The relaxation solution target stabilization index is set to "5." The low-order EM-oriented target stabilization index is set to "4."

The energy demand needs to be predicted stably for more stable condition tag value combination patterns. Therefore, the third table 90 generally assigns large values to the relaxation solution target stabilization index, the respective predictive solution target stabilization indexes, and the low-order EM-oriented target stabilization index. The energy demand needs to be more precisely for more unstable condition tag value combination patterns. Therefore, the third table 90 generally assigns small values to the relaxation solution target stabilization index, the respective predictive solution target stabilization indexes, and the low-order EM-oriented target stabilization index.

The third table 90 may be used for the lower-order energy operation apparatus 10 in the energy operation system 1 according to FIG. 5 or the energy operation apparatus 10 that is not cooperating with the other energy operation apparatuses 10 or does not use the backup energy operation apparatus 10. In this case, large values are generally assigned to the relaxation solution target stabilization index, the respective predictive solution target stabilization indexes, and the low-order EM-oriented target stabilization index in order to perform truer prediction than the prediction using the third table 90 for the higher-order energy operation apparatus 10 or the other energy operation apparatuses 10.

According to the present embodiment, the cooperating energy operation apparatus 10 notifies a target stabilization index. Moreover, the relevant energy operation apparatus may notify the cooperating energy operation apparatus 10 of the power source as an available capacity for the plan or the control or the remaining amount of the adjusting power. When another energy operation apparatus as a backup provides a small amount of available capacity, the notified energy operation apparatus 10 automatically updates the third table 90 so as to increase values of the relaxation solution target stabilization index, the predictive solution target stabilization indexes, and the low-order EM-oriented target stabilization index. Alternatively, a user updates the third table 90 for the relevant energy operation apparatus 10 as needed. When no backup is available like this, the energy operation apparatus 10 can specify itself as being finally responsible for its role and perform the prediction and the plan ensuring the high stability quality comparable to high trueness and low precision so as not to affect the energy supply despite a certain amount of variations in demand and weather conditions.

The solution quality controller 36 includes a relaxation solution target stabilization index calculator 91, a predictive solution target stabilization index calculator 92, and a low-order EM-oriented target stabilization index calculator 93.

The relaxation solution target stabilization index calculator 91 is a functional part that is implemented when the CPU 11 executes a relaxation solution target stabilization index calculation program 91P (FIG. 5) stored in the external storage unit 13. The tag data writer 82 of the condition evaluator 34 writes tag values for the weather condition and the energy demand density condition to a specified storage area of the external storage unit 13. Based on these tag values, the relaxation solution target stabilization index calculator 91 reads a numeric value stored in the relaxation solution target stabilization index column 90G included in the row corresponding to the combination pattern (condition tag value combination pattern) of these tag values in the third table 90. The relaxation solution target stabilization index calculator 91 outputs the read numeric value as a relaxation solution target stabilization index to the planner 37.

The predictive solution target stabilization index calculator 92 is a functional part that is implemented when the CPU 11 executes a predictive solution target stabilization index calculation program 92P (FIG. 5) stored in the external storage unit 13. Based on tag values for the weather condition and the energy demand density condition, the predictive solution target stabilization index calculator 92 reads numeric values stored in the first predictive solution target stabilization index column 90D, the second predictive solution target stabilization index column 90E, and the third predictive solution target stabilization index column 90F belonging to the row corresponding to the combination pattern (condition tag value combination pattern) of these tag values in the third table 90. Of these read numeric values, the predictive solution target stabilization index calculator 92 outputs the numeric value stored in the first predictive solution target stabilization index column 90D to the first predictor 31, the numeric value stored in the second predictive solution target stabilization index column 90E to the second predictor 32, and the numeric value stored in the third predictive solution target stabilization index column 90F to the third predictor 33, respectively. The numeric values are output as predictive solution target stabilization indexes.

The low-order EM-oriented target stabilization index calculator 93 is a functional part that is implemented when the CPU 11 executes a low-order EM-oriented target stabilization index calculation program 93P (FIG. 5) stored in the external storage unit 13. Based on tag values for the weather condition and the energy demand density condition, the low-order EM-oriented target stabilization index calculator 93 reads the numeric value stored in the low-order EM-oriented target stabilization index column 90H belonging to the row corresponding to the combination pattern (condition tag value combination pattern) of these tag values in the third table 90. The low-order EM-oriented target stabilization index calculator 93 transmits the numeric value as a low-order EM-oriented target stabilization index to the lower-order energy operation apparatus 10 via the corresponding communication apparatus 15 (FIG. 5).

The relaxation solution target stabilization index calculator 91, the predictive solution target stabilization index calculator 92, and the low-order EM-oriented target stabilization index calculator 93 may correct the relaxation solution target stabilization index, the predictive solution target stabilization index, or the low-order EM-oriented target stabilization index based on the low-order EM-oriented target stabilization index supplied from the configuration inputter 35. In this case, the relaxation solution target stabilization index calculator 91, the predictive solution target stabilization index calculator 92, and the low-order EM-oriented target stabilization index calculator 93 can calculate a relaxation solution target stabilization index, a predictive solution target stabilization index, or a low-order EM-oriented target stabilization index after the correction using the following equation,

[Math. 1]

$$A'=(A-a)\times B \tag{1}$$

where A denotes the relaxation solution target stabilization index, the predictive solution target stabilization index, or the low-order EM-oriented target stabilization index; B denotes the low-order EM-oriented target stabilization index (such as "0.2") notified from the higher-order energy operation apparatus; a denotes the constant (such as "3"); and A' denotes the relaxation solution target stabilization index, the predictive solution target stabilization index, or the low-order EM-oriented target stabilization index after the correction.

However, this correction may place a value of the fractional part in the relaxation solution target stabilization index, the predictive solution target stabilization index, and/or the low-order EM-oriented target stabilization index after the correction. In this case, the energy operation apparatus 10 may be configured as follows. The relaxation solution target stabilization index calculator 91, the predictive solution target stabilization index calculator 92, and the low-order EM-oriented target stabilization index calculator 93 directly output the calculated relaxation solution target stabilization index, predictive solution target stabilization index, or low-order EM-oriented target stabilization index to the planner 37, the first through third predictors 31 through 33, or the lower-order energy operation apparatus 10. The planner 37, the first through third predictors 31 through 33, or the lower-order energy operation apparatus 10 receives the relaxation solution target stabilization index, predictive solution target stabilization index, or the low-order EM-oriented target stabilization index and performs a process similar to the above based on the value in the whole number part of the relaxation solution target stabilization index, the predictive solution target stabilization index, or the low-order EM-oriented target stabilization index.

The planner 37 is a functional part having the function that prepares a plan corresponding to the role of the relevant energy operation apparatus 10 based on a predicted value for energy demand supplied from the regressive prediction processor 72 of the third predictor 33 and a relaxation solution target stabilization index supplied from the relaxation solution target stabilization index calculator 91 of the solution quality controller 36. The planner 37 includes a restriction relaxation processor 100 and a planning processor 101.

The restriction relaxation processor 100 is a functional part that is implemented when the CPU 11 executes a restriction relaxation program 100P (FIG. 5) stored in the external storage unit 13. As will be described later, there is provided a permissible gap rate corresponding to the exact solution for a plan prepared by the planning processor 101. The restriction relaxation processor 100 assigns the permissible gap rate to the planning processor 101 based on a value of the relaxation solution target stabilization index supplied from the relaxation solution target stabilization index calculator 91 of the solution quality controller 36.

Figure 10:
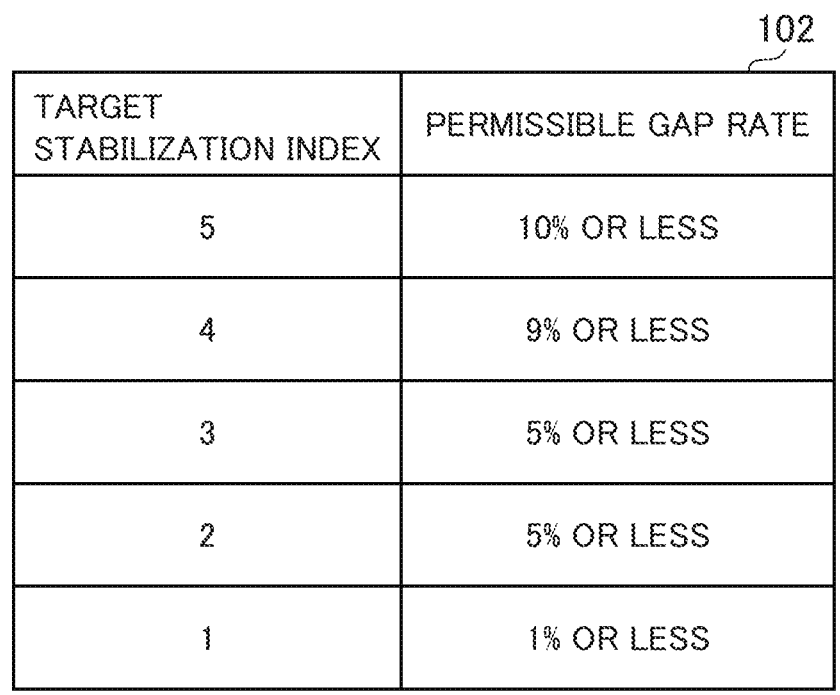
FIG. 10 is a diagram illustrating a configuration of a fourth table.

As illustrated in FIG. 10, the restriction relaxation processor 100 actually maintains a fourth table 102 that defines permissible gap rates corresponding to exact solutions predetermined for values of the relaxation solution target stabilization index. A user previously creates the fourth table 102. The fourth table 102 increases the permissible gap rate as the value of the predictive solution target stabilization index increases (to increase the quality) in order to more stably and quickly provide a prediction result. The fourth table 102 decreases the permissible gap rate as the value of the predictive solution target stabilization index decreases (to decrease the quality) in order to provide a more precise prediction result.

The relaxation solution target stabilization index calculator 91 of the solution quality controller 36 supplies the relaxation solution target stabilization index to the restriction relaxation processor 100. The restriction relaxation processor 100 then reads the permissible gap rate assigned to the value of the relaxation solution target stabilization index from the fourth table 102 and assigns the permissible gap rate to the planning processor 101.

The planning processor 101 is a functional part that is implemented when the CPU 11 executes a planning processing program 101P (FIG. 5) stored in the external storage unit 13. The planning processor 101 prepares a plan concerning the energy supply corresponding to the role of the relevant energy operation apparatus 10 within the range of the permissible gap rate assigned by the restriction relaxation processor 100 based on the predicted value for the energy demand supplied from the regressive prediction processor 72 of the third predictor 33. The planning processor 101 controls an external apparatus in accordance with the prepared plan.

In the energy operation system 1 as illustrated in FIG. 4, for example, the energy operation apparatus 2AD for each consumer 4 or for the electric generating station 5 prepares a plan to control the power generator 6 or the load 7 connected to the relevant energy operation apparatus 2AD and controls the power generator 6 or the load 7 in accordance with the prepared plan. The energy operation apparatus 2AD for the aggregator 8 prepares a plan to control the lower-order energy operation apparatuses 2AD connected to the relevant energy operation apparatus 2AD and controls the lower-order energy operation apparatuses 2AD in accordance with the prepared plan.

The energy operation apparatus 2BBB for an energy operation company of an electric power retailing company prepares a plan to accept or order the electric power from an electric power exchange or a plan to control the power generator 6 or the load in the management area. The energy operation apparatus 2BBB accepts or orders the electric power from the electric power exchange or provides the lower-order energy operation apparatus 2AD with a directive concerning the energy supply in accordance with the prepared plan. Normally, an electric power exchange 2BA performs electricity transaction in units of 30 minutes (or 15 minutes or one hour). Therefore, the energy operation apparatus 2BBB also performs prediction or planning in units of 30 minutes.

The energy operation apparatus 2BBA for the local electric power transmission company moreover performs planning and control to establish a correspondence between momentary generation of the electric power (posiwatt or negawatt) and momentary consumption of the electric power including time intervals shorter than 30 minutes. Momentarily generating the electric power in accordance with demand variations is referred to as an adjusting power. The energy operation apparatus 2BBA predicts the amount of required adjusting power in the future time slice and generates a plan to order the adjusting power from an adjusting power exchange 2BC. The energy operation apparatus 2BBA issues a control directive to the energy operation apparatus 2AD of the electric generating station as a supplier of the adjusting power, namely, the order received and to the energy operation apparatus 2AD of the aggregator 8. The energy operation apparatus 2AD of the electric generating station and the energy operation apparatus 2AD of the aggregator 8 follow the directive to control the adjusting power in preference to the others.

(1-3) Process Flows (1-3-1) Process Flows in the Energy Operation Apparatus

Figure 11:
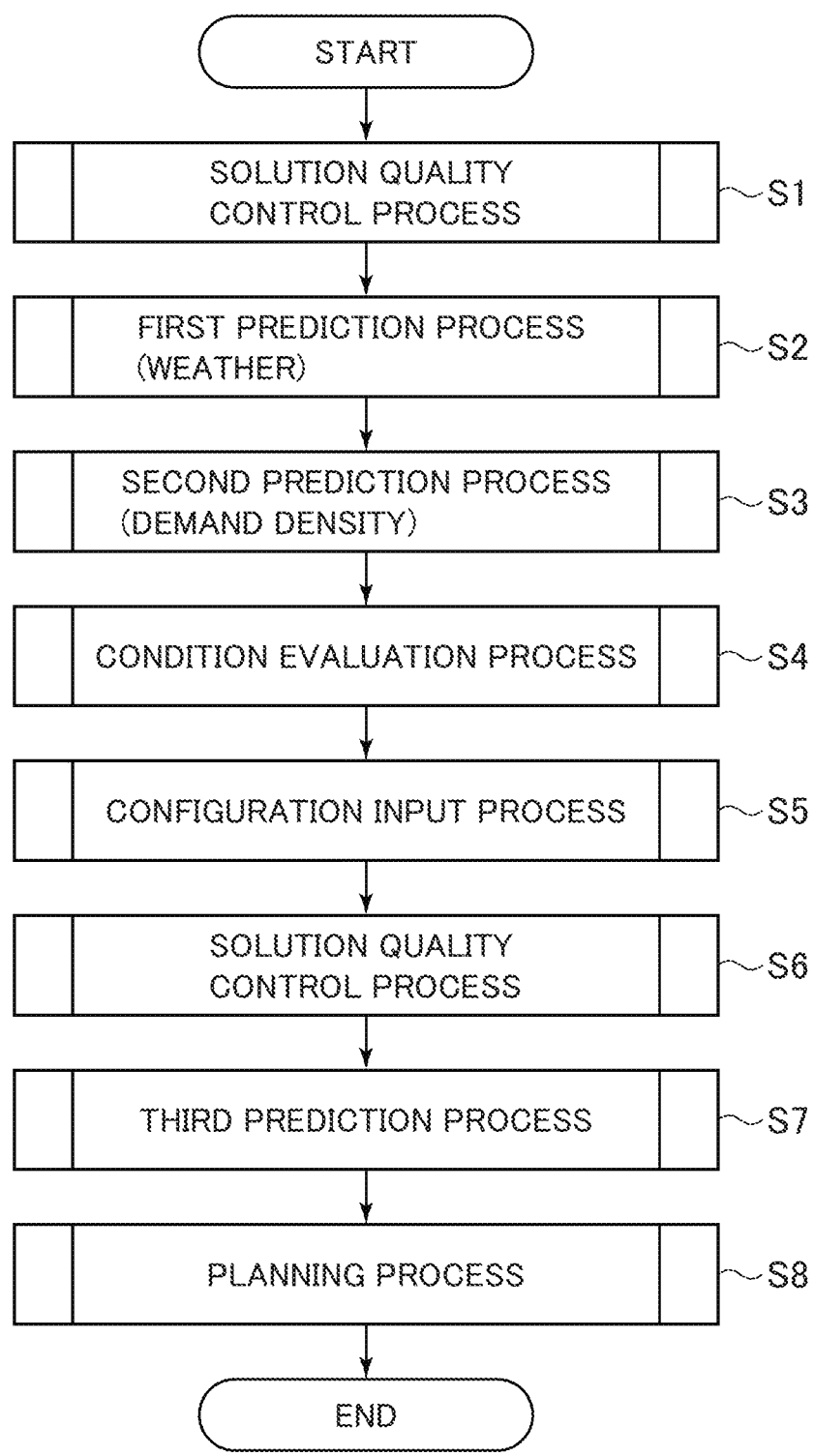
FIG. 11 is a flowchart illustrating a sequence of processes performed in the energy operation apparatus for energy supply and demand.

FIG. 11 illustrates a sequence of processes concerning the plan and control of energy supply performed in the energy operation apparatus 10. The sequence thereof is hereinafter referred to as an energy supply plan and control process. The energy supply plan and control process are performed periodically.

During the previous energy supply plan and control process, the tag data writer 82 (FIG. 6) of the condition evaluator 34 (FIG. 6) writes the tag value of the weather condition and the tag value of the energy demand density condition to a specified storage area of the external storage unit 13. During the previous energy supply plan and control process, the configuration inputter 35 (FIG. 6) supplies the low-order EM-oriented target stabilization index. Based on the tag values and the index above, the energy operation apparatus 10 allows the solution quality controller 36 (FIG. 6) to calculate a relaxation solution target stabilization index, predictive solution target stabilization indexes to be supplied to the first through third predictors 31 through 33 (FIG. 6), and a low-order EM-oriented target stabilization index to be supplied to the lower-order energy operation apparatus 10 (S1).

The first predictor 31 predicts the future weather in a management area of the relevant energy operation apparatus 10 based on past weather data stored in the weather data storer 41 (FIG. 6) and the predictive solution target stabilization index supplied from the solution quality controller 36 and outputs a prediction result to the condition evaluator 34 (S2).

The second predictor 32 predicts the future energy demand density in a management area of the relevant energy operation apparatus 10 based on observation values of the demand factors stored in the demand factor data storer 42 and the predictive solution target stabilization index supplied from the solution quality controller 36. The second predictor 32 outputs prediction results to the third predictor 33 and the condition evaluator 34, respectively (S3).

The first predictor 31 supplies the prediction result concerning the weather in the management area of the relevant energy operation apparatus 10. The second predictor 32 supplies the prediction result concerning the future energy demand density in the management area of the relevant energy operation apparatus 10. Based on these prediction results, the condition evaluator 34 evaluates temporal and spatial dispersion states of the weather condition and the energy demand density condition. The condition evaluator 34 writes a tag value representing the future situation of the weather condition and a tag value representing the future situation of the energy demand density condition to specified storage areas of the external storage unit 13, respectively (S4).

The configuration inputter 35 (FIG. 6) then acquires the low-order EM-oriented target stabilization index that is supplied from the higher-order energy operation apparatus 10 or is specified by a user using the input apparatus 21 (FIG. 5) of the input/output interface 14 (FIG. 5). The configuration inputter 35 outputs the low-order EM-oriented target stabilization index to the solution quality controller 36 (S5).

The condition evaluator 34 writes tag values of the weather condition and the energy demand density condition to specified storage areas of the external storage unit 13. The configuration inputter 35 supplies the low-order EM-oriented target stabilization index. Based on these current tag values and index, the solution quality controller 36 acquires the relaxation solution target stabilization index, the predictive solution target stabilization indexes corresponding to the first through third predictors 31 through 33, and the low-order EM-oriented target stabilization index corresponding to the lower-order energy operation apparatus 10. The solution quality controller 36 outputs the acquired relaxation solution target stabilization index to the planner 37 (FIG. 6). The solution quality controller 36 outputs the acquired predictive solution target stabilization indexes corresponding to the first through third predictors 31 through 33 correspondingly to the first through third predictors 31 through 33. The solution quality controller 36 outputs the low-order EM-oriented target stabilization index to the lower-order energy operation apparatus 10 via the communication apparatus 15 (FIG. 5) (S6).

The third predictor 33 predicts the future energy demand in the management area based on demand data stored in the demand data storer 40 (FIG. 6) of the reference data storer 30 (FIG. 6), weather data stored in the weather data storer 41 (FIG. 6), measurements concerning the demand factors stored in the demand factor data storer 42 (FIG. 6), necessary market data stored in the market data storer 43 (FIG. 6), and the prediction result supplied from the second predictor 32 concerning the future energy demand density in the management area of the relevant energy operation apparatus. The third predictor 33 outputs a prediction result to the planner 37 (S7).

The third predictor 33 supplies the prediction result for the future energy demand density in the management area for the relevant energy operation apparatus. The solution quality controller 36 supplies the relaxation solution target stabilization index. Based on these result and index, the planner 37 prepares a plan of the future energy supply in the management area and controls a corresponding external instrument according to the prepared plan (S8).

As above, a sequence of the energy supply plan and control process terminates. The process in steps S2 and S3 or steps S4 and S5 may be performed in parallel. The process in step S7 may be performed in parallel with the process in steps S4 through S6.

(1-3-2) First Prediction Process

Figure 12:
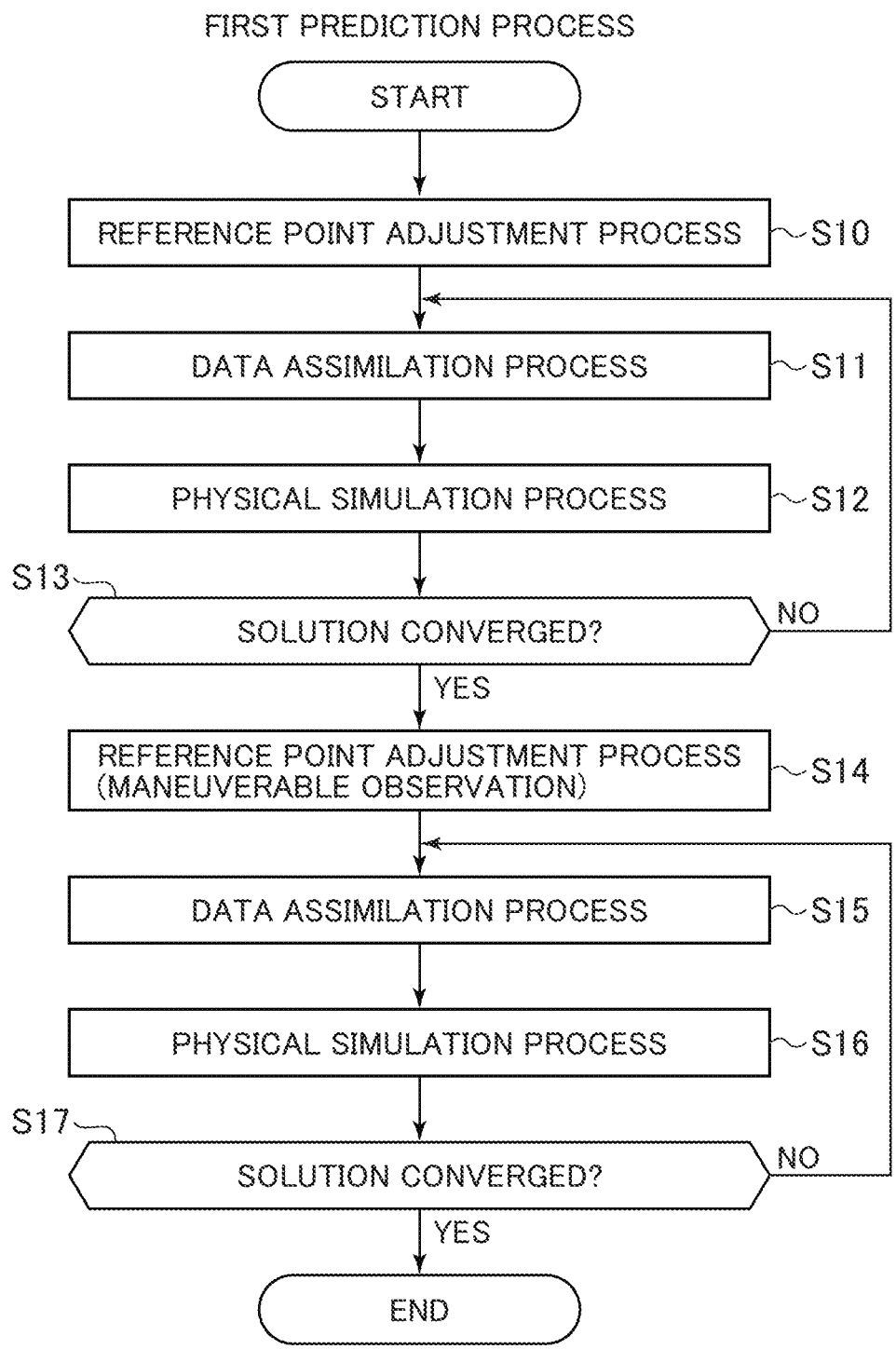
FIG. 12 is a flowchart illustrating a procedure of a first prediction process.

FIG. 12 illustrates the specific contents of the first prediction process performed by the first predictor 31 in step S2 of the energy supply plan and control process in FIG. 11 described above.

In step S1 of the energy supply plan and control process, the first predictor 31 starts the first prediction process illustrated in FIG. 12. The reference point adjustment processor 50 (FIG. 6) determines a reference point in order to predict the future weather in a management area for the relevant energy operation apparatus 10 based on the quality corresponding to the value of the predictive solution target stabilization index currently supplied from the solution quality controller 36 (S10). The determination assumes that a meteorological computational grid is determined as a reference point and corresponds to the value of the predictive solution target stabilization index that is defined in the first table 56 (FIG. 7) and is supplied from the solution quality controller 36.

The data assimilation processor 51 (FIG. 6) of the first data assimilator 52 (FIG. 6) performs a data assimilation process that assimilates weather data with data as a simulation result (S11). The weather data emphasizes the reference point determined by the reference point adjustment processor 50. The simulation result is acquired from the physical simulation performed by the physical simulator.

The physical simulator 55 (FIG. 6) performs the physical simulation of the weather at reference points based on the weather data at the reference points supplied from the data assimilation processor 51 (S12). The physical simulator 55 determines whether the simulation result of the physical simulation converges on a predetermined threshold value (S13).

If the determination in step S13 causes a negative result, the process in steps S11 through S13 is repeated subsequently until the simulation result of the physical simulation converges on the predetermined threshold value.

If the determination in step S13 causes an affirmative result, the reference point adjustment processor for maneuverable observation 53 (FIG. 6) determines a reference point out of the meteorological computational grids that enable the maneuverable observation to provide current weather data (S14). The reference point is used to predict the future weather in the management area for the relevant energy operation apparatus 10 based on the quality corresponding to the value of the predictive solution target stabilization index currently supplied from the solution quality controller 36.

The sequential data assimilation processor (FIG. 6) performs a data assimilation process that assimilates weather data with data as a simulation result (S15). The weather data emphasizes the reference point determined by the reference point adjustment processor for maneuverable observation 53. The simulation result is acquired from the physical simulation performed by the physical simulator 55.

The physical simulator 55 performs the physical simulation of the weather at reference points based on the weather data at the reference points supplied from the sequential data assimilation processor 54 and the simulation model generated from the physical simulation in step S12 (S16). This process corrects the simulation model generated in step S12 based on the current weather data acquired from the maneuverable observation. The physical simulator 55 determines whether the simulation result of the physical simulation converges on a predetermined threshold value (S17).

If the determination in step S17 causes a negative result, the process in steps S15 through S17 is repeated subsequently until the simulation result of the physical simulation converges on the predetermined threshold value. If the determination in step S17 causes an affirmative result, the physical simulator 55 outputs the simulation result from the physical simulation to the condition evaluator 34. Then, the first prediction process terminates.

(1-3-3) Second Prediction Process

Figure 13:
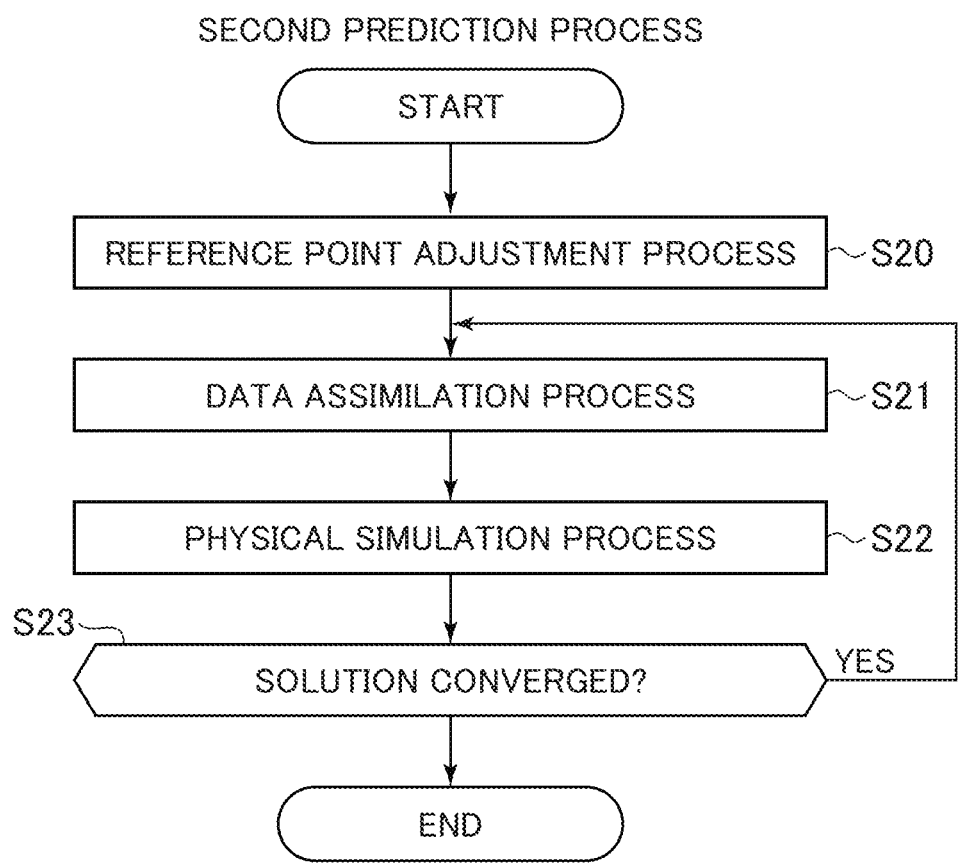
FIG. 13 is a flowchart illustrating a procedure of a second prediction process.

FIG. 13 illustrates the specific contents of the second prediction process performed by the second predictor 32 in step S3 of the energy supply plan and control process in FIG. 11 described above.

In step S3 of the energy supply plan and control process, the second predictor 32 starts the second prediction process illustrated in FIG. 13. The reference point adjustment processor 60 of the second data assimilator 62 (FIG. 6) determines a reference point in order to predict the future energy demand density in a management area for the relevant energy operation apparatus 10 based on the quality corresponding to the value of the predictive solution target stabilization index currently supplied from the solution quality controller 36 (S20).

The data assimilation processor 61 of the second data assimilator 62 performs a data assimilation process that assimilates observation data for demand factors with data as a simulation result (S21). The observation data emphasizes the reference point determined by the reference point adjustment processor 60. The simulation result is acquired from the physical simulation performed by the physical simulator 63.

The physical simulator 63 performs the physical simulation of the energy demand density at the reference points based on the observation data for the demand factors at the reference points supplied from the data assimilation processor 61 (S22). The physical simulator 63 determines whether the simulation result of the physical simulation converges on a predetermined threshold value (S23).

If the determination in step S23 causes a negative result, the process in steps S21 through S23 is repeated subsequently until the simulation result of the physical simulation converges on the predetermined threshold value. If the determination in step S23 causes an affirmative result, the physical simulator 63 outputs the physical simulation to the regressive prediction processor 72 (FIG. 6) of the third predictor 33 and the condition evaluator 34 (FIG. 6). Then, the second prediction process terminates.

(1-3-4) Condition Evaluation Process

Figure 14:
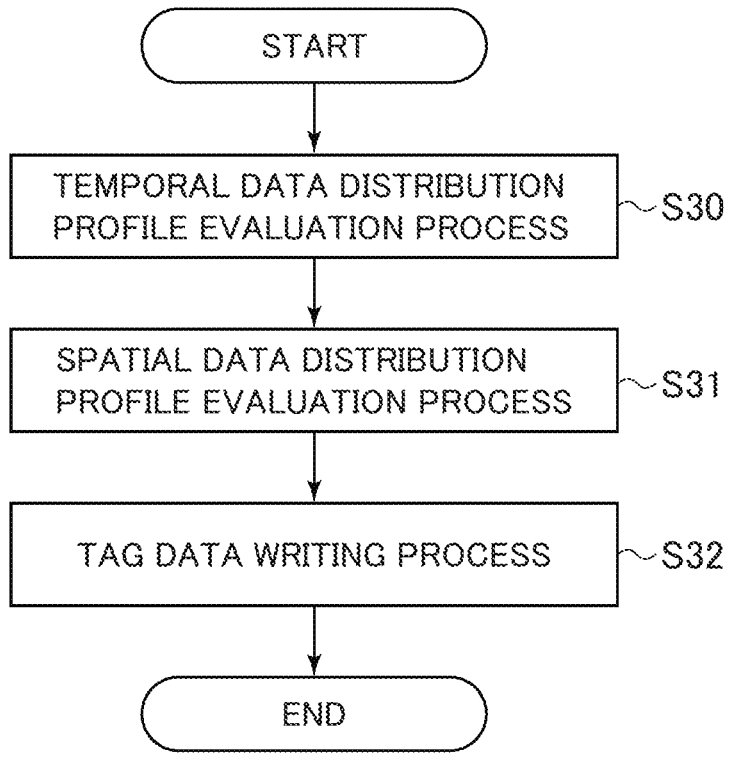
FIG. 14 is a flowchart illustrating a procedure of a condition evaluation process.

FIG. 14 illustrates the specific contents of the condition evaluation process performed by the condition evaluator 34 in step S4 of the energy supply plan and control process in FIG. 11 described above.

In step S4 of the energy supply plan and control process, the condition evaluator 34 starts the condition evaluation process illustrated in FIG. 14. The physical simulator 55 of the first predictor 31 performs a physical simulation to provide weather data at each reference point as a simulation result. The temporal data distribution profile evaluator 80 (FIG. 6) evaluates the magnitude of a temporal change in predicted values of the weather data in accordance with dispersion states (dispersion values) of the predicted values, for example, and calculates a weighted average (S30).

The physical simulators 55 and 63 of the first and second predictors 31 and 32 perform the physical simulation to provide predicted values at the reference points. Based on the predicted values, the spatial data distribution profile evaluator 81 (FIG. 6) uses a dispersion state (dispersion value) of the predicted values at the same time slice to evaluate the change in the predicted values between the reference points on the same plane parallel to the horizontal direction or the vertical direction (S31).

The condition evaluation may be performed based on the degree of the multimodality of distribution profiles of predicted values instead of the dispersion situation (dispersion value) of predicted values. It may be favorable to use the number of objects extracted from spatial data (such as the number of partitions in the same atmospheric pressure plane of the weather). The evaluation may use the power spectrum density (variation intensity) in the chronological spectral analysis at the predicted time slice provided for every specified time (such as one hour). These distribution profile evaluations increase the calculation time but may provide more appropriate evaluations.

The physical simulator 55 of the first predictor 31 performs a simulation to provide the future weather condition. The physical simulator 63 of the second predictor 32 performs a simulation to provide the future energy demand density condition. The tag data writer 82 (FIG. 6) determines the stability of the future weather condition and the future energy demand density condition based on the evaluation results (dispersion values) from the temporal data distribution profile evaluator 80 and the spatial data distribution profile evaluator 81. The tag data writer 82 writes tag values corresponding to the determination results for the weather condition and the energy demand density condition to a specified storage area of the external storage unit 13 (S32). Then, the condition evaluation process terminates.

The spatial data distribution profile evaluation includes an evaluation performed on data distribution at the most recent time or distribution of just the observation data stored in the reference data storer (sampling distribution) rather than data distribution at the future time slice. The spatial data distribution profile evaluation may be performed at each time slice and may provide tag data for each evaluation. The present embodiment supplies tag data to an evaluation result at the time slice (such as 14:00 on the next day) for a major prediction object.

(1-3-5) Configuration Input Process

Figure 15:
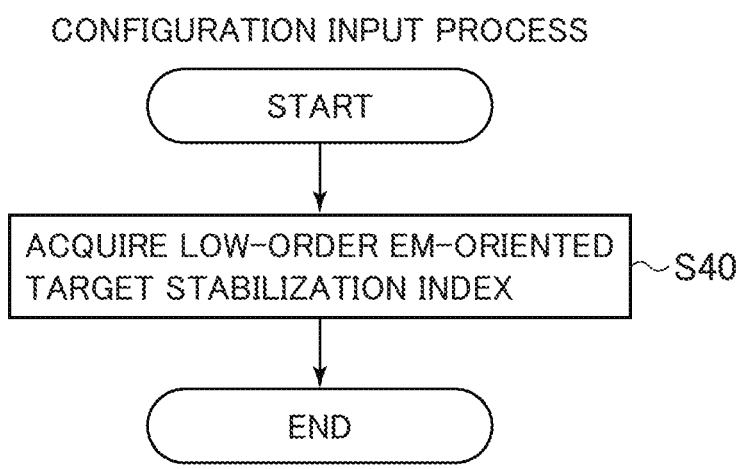
FIG. 15 is a flowchart illustrating a procedure of a configuration input process.

FIG. 15 illustrates the specific contents of the configuration input process performed by the configuration inputter 35 (FIG. 6) in step S5 of the energy supply plan and control process in FIG. 11 described above.

In step S5 of the energy supply plan and control process, the configuration inputter 35 starts the configuration input process illustrated in FIG. 15. The configuration inputter 35 acquires the low-order EM-oriented target stabilization index specified by the higher-order cooperating energy operation apparatus 10 or by the user using the input/output interface 14 (S40). Then, the configuration inputter 35 terminates the configuration input process.

(1-3-6) Solution Quality Control Process

Figure 16:
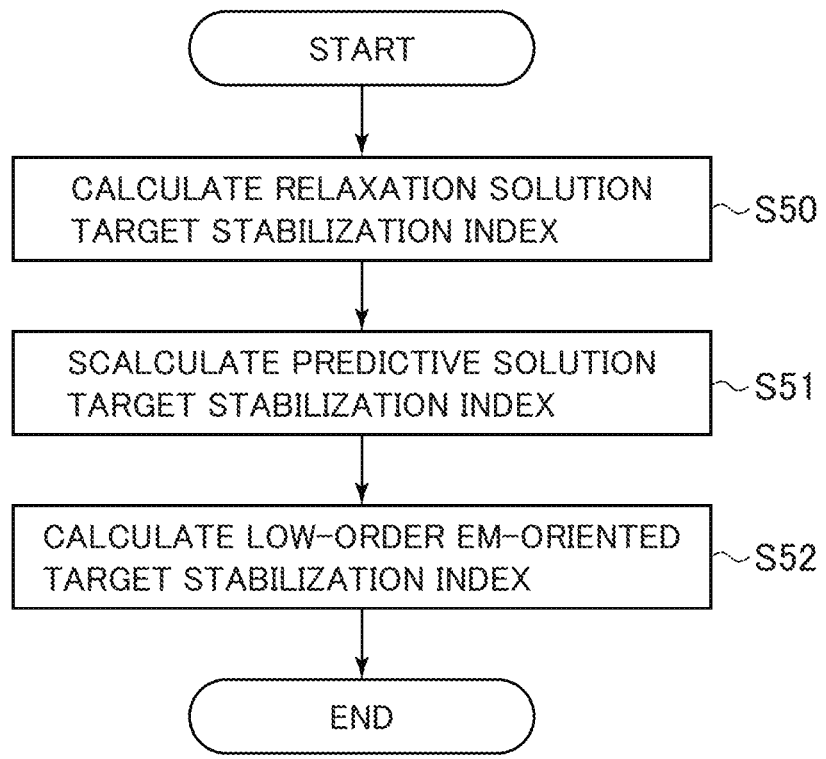
FIG. 16 is a flowchart illustrating a procedure of a solution quality control process.

FIG. 16 illustrates the specific contents of the solution quality control process performed by the solution quality controller 36 in step S6 of the energy supply plan and control process in FIG. 11 described above.

In step S6 of the energy supply plan and control process, the solution quality controller 36 starts the solution quality control process illustrated in FIG. 16. In step S32 of the condition evaluation process (FIG. 14), the tag data writer 82 writes tag values of the weather condition and the energy demand density condition to a specified storage area of the external storage unit 13. The relaxation solution target stabilization index calculator 91 (FIG. 6) reads these tag values. Based on the read tag values, the relaxation solution target stabilization index calculator 91 reads the corresponding relaxation solution target stabilization index from the fourth table 90 (FIG. 9) and outputs the relaxation solution target stabilization index to the restriction relaxation processor 100 (FIG. 6) of the planner 37 (FIG. 6) (S50).

Similarly to the relaxation solution target stabilization index calculator 91, the predictive solution target stabilization index calculator 92 (FIG. 6) reads the tag values of the weather condition and the energy demand density condition. Based on the read tag values, the predictive solution target stabilization index calculator 92 reads the corresponding predictive solution target stabilization indexes for the first through third predictors 31 through 33 from the fourth table 90 and outputs the read predictive solution target stabilization indexes to the corresponding first through third predictors 31 through 33 (S51).

Similarly to the relaxation solution target stabilization index calculator 91, the low-order EM-oriented target stabilization index calculator 93 reads tag values of the weather condition and the energy demand density condition. Based on the read tag values, the low-order EM-oriented target stabilization index calculator 93 reads the corresponding low-order EM-oriented target stabilization index from the fourth table 90 and transmits the read relaxation solution target stabilization index to the lower-order energy operation apparatus 10 (S52). Then, the solution quality control process terminates.

(1-3-7) Third Prediction Process

Figure 17:
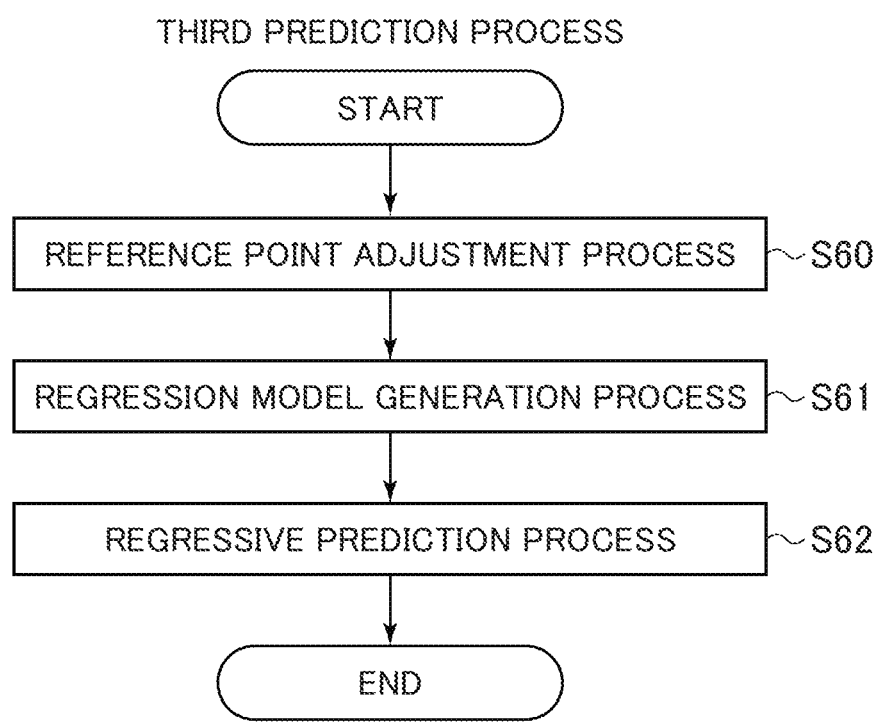
FIG. 17 is a flowchart illustrating a procedure of a third prediction process.

FIG. 17 illustrates the specific contents of the third prediction process performed by the third predictor 33 in step S7 of the energy supply plan and control process in FIG. 11 described above.

In step S7 of the energy supply plan and control process, the third predictor 33 starts the third prediction process illustrated in FIG. 17. The regression model generator 71 (FIG. 6) needs to generate a regression model in order to predict the future energy demand (electric power demand) in a management area for the relevant energy operation apparatus 10 based on the quality corresponding to the value of the predictive solution target stabilization index currently supplied from the solution quality controller 36. To do this, the reference point adjustment processor 70 reads the type and the condition of the regression model from the second table 73 (FIG. 8) and outputs the read type and condition of the regression model to the regression model generator 71 (S60).

The regression model generator 71 generates a regression model that satisfies the type and the condition of the regression model supplied from the reference point adjustment processor 70 and is found between the energy demand in the management area for the relevant energy operation apparatus 10 and an explanatory variable (S61). The regression model generator 71 outputs the generated regression model to the regressive prediction processor 72 (FIG. 6).

The regressive prediction processor 72 acquires a value of the necessary explanatory variable from the reference data storer 30 and a simulation result supplied from the physical simulator 63 of the second predictor 32. The regressive prediction processor 72 applies the acquired value to the regression model supplied from the regression model generator 71 and thereby calculates a predicted value for the energy demand at the time slice (specified time) in the management area of the relevant energy operation apparatus 10. The regressive prediction processor 72 outputs the calculated predicted value for the energy demand to the planning processor 101 (FIG. 6) of the planner 37 (FIG. 6) (S62). Then, the third prediction process terminates.

(1-3-8) Planning Process

Figure 18:
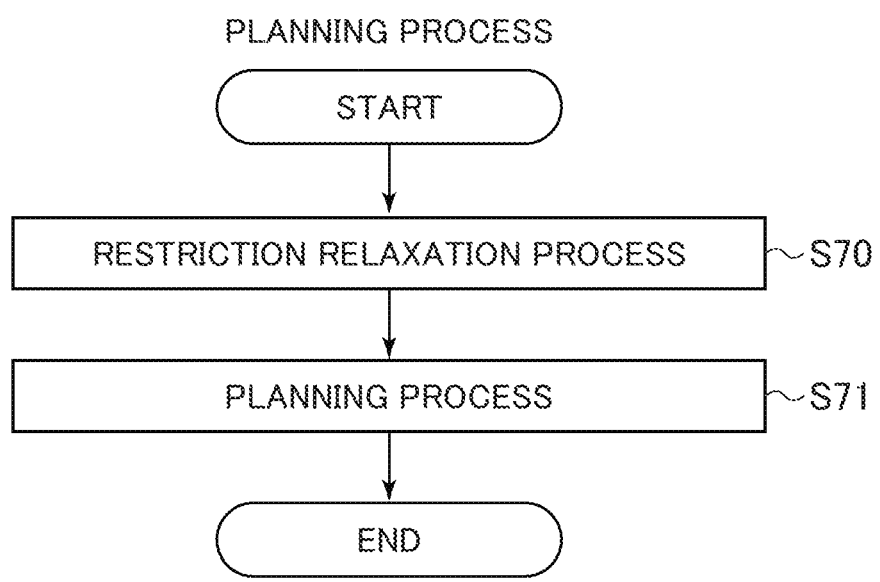
FIG. 18 is a flowchart illustrating a procedure of a planning process.

FIG. 18 illustrates the specific contents of the planning process performed by the planner 37 in step S8 of the energy supply plan and control process in FIG. 11 described above.

In step S8 of the energy supply plan and control process, the planner 37 starts the planning process illustrated in FIG. 18. The relaxation solution target stabilization index calculator 91 of the solution quality controller 36 supplies the value of the relaxation solution target stabilization index. Based on this value, the restriction relaxation processor 100 (FIG. 6) provides the planning processor 101 with a permissible gap rate from the exact solution for the plan prepared by the planning processor 101 (S70).

The regressive prediction processor 72 of the third predictor 33 supplies the predicted value for the energy demand. Based on this predicted value, the planning processor 101 prepares an energy supply plan corresponding to the role of the relevant energy operation apparatus 10 within the range of the permissible gap rate provided by the restriction relaxation processor 100 and controls an external apparatus in accordance with the prepared plan (S71). Then, the planning process terminates.

The planning processor 101 performs processes based on the branch and bound method or the interior point method known as a solution to optimization problems with constraint conditions such as a start-and-stop problem of when to start and operate the power generation (including power purchase from the market and negawatt power). The permissible gap rate used signifies a rate from the upper or lower bound of a gap (a difference between the upper bound and the lower bound) as a condition to cancel the calculation using the branch and bound method or the interior point method.

In addition to the present embodiment, a planning process based on power generation patterns may be performed as follows. The case analysis is applied to a condition of the demand or the weather. A power generation pattern is generated by classifying data as to what type of power generation supplies the power under the condition. Based on this power generation pattern, a power generation pattern satisfying the condition is used as a plan result. It may be also favorable to increase or decrease the number of case analyses for the demand and the weather or the number of generating similar power generation patterns.

In this case, a target stabilization index from the solution quality controller may be small, signifying that the quality of the solution stability is low but the precise planning is expected. The restriction relaxation processor then increases the number of case analyses for the demand and the weather or the number of generating similar power generation patterns. Alternatively, the target stabilization index may be large, signifying that the quality of the solution stability is high and the planning solution does not vary greatly despite some errors in estimating the condition of the demand and the weather. The restriction relaxation processor then decreases the number of case analyses for the demand and the weather or the number of generating similar power generation patterns.

A large number of case analyses or power generation patterns provides a plan result representing a power generation pattern more approximate to the exact solution for the optimization problem. However, the power generation operation may be difficult due to an error in the condition of the demand and the weather. Meanwhile, a small number of case analyses or power generation patterns provides a plan result representing a relaxed average power generation pattern. The plan result imprecisely corresponds to the exact solution for the optimization problem but enables the power generation operation despite minute variations (fringes) in the condition of the demand and the weather.

(1-4) Effects of the Present Embodiment

As above, in the energy operation system 1 according to the present embodiment, the energy operation apparatus 10 controls the precision of the energy demand in a management area or the energy supply plan based on the weather condition and the energy demand density condition in the management area and the value of a target stabilization index (low-order EM-oriented target stabilization index) supplied from the higher-order energy operation apparatus 10.

In this case, some configurations of the energy operation system 1 may limit the information available for prediction of the future energy demand to data measured at a power-system electric generating station or a primary substation. The prediction based on a limited physical model cannot sufficiently use physical models of air conditioning utilization, traffic utilization, or industries in an action area of the consumers, causing a systematic error bias and decreasing the prediction precision of the energy demand. In this respect, the energy operation apparatus 10 according to the present embodiment predicts the energy demand by using observation values (observation data) of various demand factors such as the road traffic in the management area or the actual communication traffic. It is possible to prevent the prediction precision of the energy demand from degrading.

Information available for prediction of the energy demand may be limited to observation values (observation data). In such a case, it is impossible to generate a regression model ensuring the sufficient reproducibility. The regression model may be unstable. The prediction using such an unstable regression model may vary the regression model by adding several pieces of observation data containing a rare numeric value representing impression data about the hottest day in past ten years, for example. A stochastic error variance occurs, degrading the precision to predict the energy demand. In this respect, the energy operation apparatus 10 according to the present embodiment allows the first predictor 31 to use also the current weather data, making it possible to avoid this issue from occurring.

The energy operation apparatus 10 according to the present embodiment performs the above-described processes and thereby makes it possible to change between prediction processes such as high-bias and low-variance prediction and low-bias and high-variance prediction in order to perform the prediction appropriate to various conditions of the weather and the energy demand density. Alternatively, it is possible to change between prediction processes whether to acquire a highly stable solution or a highly exact solution in terms of predicted values as a solution to search for future states using a prediction model (regression model).

The "highly exact solution" is acquired from a precise model (an advantageously reproducible model). For example, a prediction process under ideal circumstances generates an elaborate regression model using many explanatory variables without errors and is capable of providing a highly precise predicted value with few errors, namely, a highly exact predicted value. However, it is not always possible to generate an elaborate model containing no errors. For example, a regression model greatly varies in proportion to the addition of a plurality of samples around a boundary between aggregates of sample data such as sample data representing the complicated relationship between weather data and demand data containing temperatures in terms of the highest temperature in past ten years.

The "highly stable solution" signifies, for example, a solution using a highly true regression model that hardly varies with a change in the mathematical condition such as the addition of sample data. The "highly stable solution" contains some errors but does not cause a large error on average even when the prediction process is repeated while adding samples as needed. A deviation between solutions is small (namely, stable solutions). For example, suppose the prediction process uses a predicted value representing a solution to a weighted average model for demand data in the past ten years. Even if data for several days is added, the process causes a minute change, if any, in the solution and causes a small deviation between solutions.

As above, in the energy operation system 1 according to the present embodiment, each energy operation apparatus 10 controls the precision of a plan concerning the energy demand or the energy supply in a management area of the energy operation apparatus 10 based on the weather condition and the energy demand density condition in the relevant management area. Therefore, it is possible to acquire a solution that satisfies the solution stability and exactness such as the trueness of solution and the temporal granularity fineness of a solution. The solution stability and exactness are comparable to the quality of a solution appropriate for the weather condition and the energy demand density condition in a management area. The energy operation is available based on such a solution, making it possible to stably supply the energy or provide the adjustment control.

(2) Second Embodiment

Figure 19:
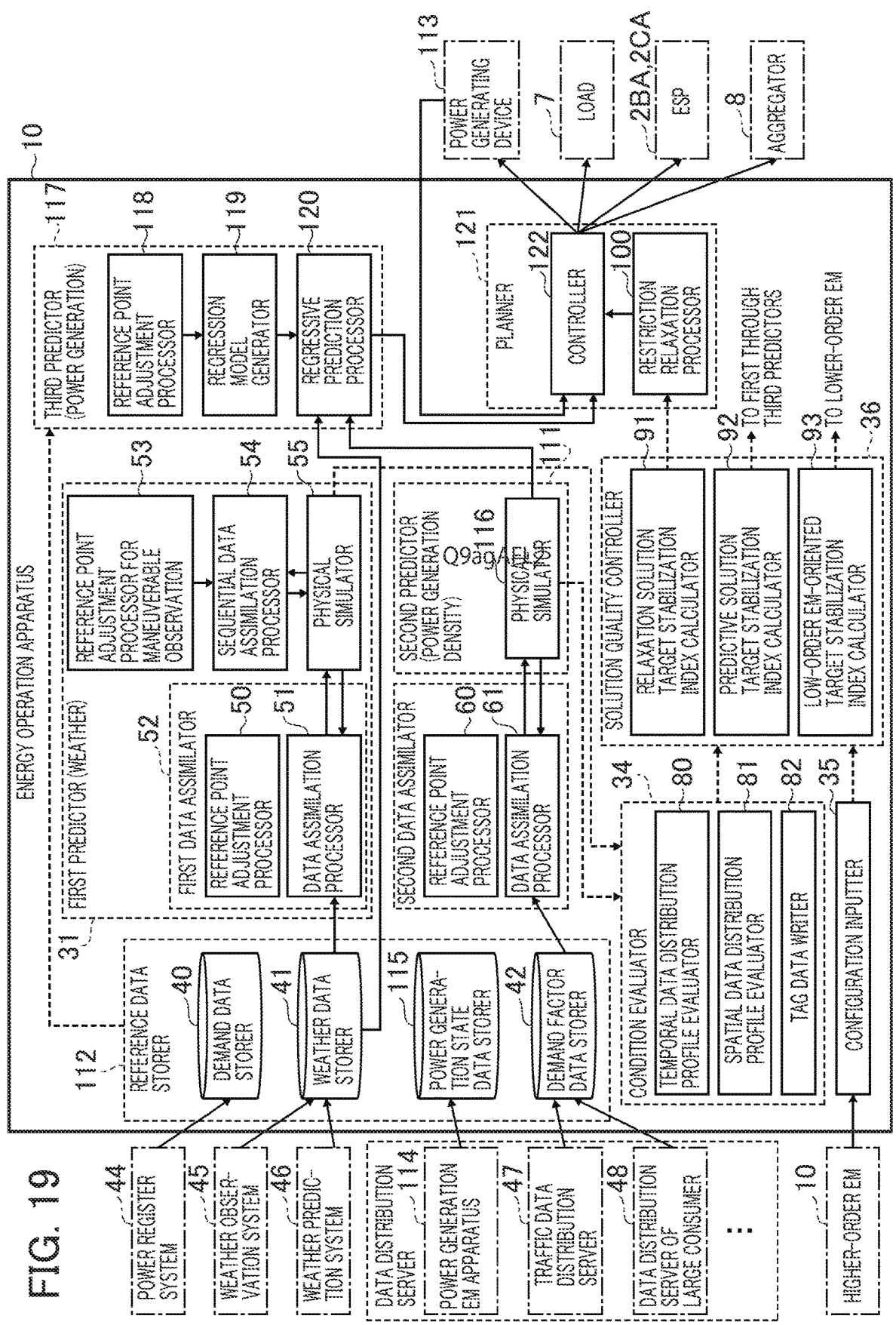
FIG. 19 is a block diagram illustrating a logical configuration of an energy operation apparatus according to a second embodiment.

The mutually corresponding parts in FIGS. 19 and 6 are designated by the same reference numerals. FIG. 19 illustrates an energy operation apparatus 110 according to the second embodiment applied to the energy operation system 1 shown in FIG. 4. The energy operation apparatus 110 replaces the energy operation apparatus 10 according to the first embodiment. The energy operation apparatus 110 largely differs from the energy operation apparatus 10 according to the first embodiment in that a second predictor 111 predicts a future power generation density in a management area for the relevant apparatus 110 instead of a future energy demand density in the management area. The other features almost equal those of the energy operation apparatus 10 according to the first embodiment.

Actually, in the energy operation apparatus 110, the reference data storer 112 includes a power generation state data storer 115 instead of the market data storer 43 (FIG. 6). An energy operation apparatus 114 manages a power generating device 113 (power generator 6) to generate power such as a solar power generation device, a wind power generator, or a thermal power generator in the energy operation system 1. The power generation state data storer 115 stores power generation state data, namely data representing the power generation state of the power generating device 113. The power generation state data is collected from the energy operation apparatus 114.

In the second predictor 111, a physical simulator 116 performs a physical simulation of a future power generation density (power generation amount per unit area) for the power generating device 113 in a management area of the relevant energy operation apparatus 110. The data assimilation processor 61 performs a data assimilation process that assimilates the power generation state data stored in the power generation state data storer 115 with data of a simulation result from the physical simulation performed by the physical simulator 116. The simulation result data signifies a prediction result concerning the power generation density at each reference point determined by the reference point adjustment processor 60.

For example, suppose a plane includes a mesh of 20 km by 20 km separated by a meteorological computational grid for the weather simulation. This plane is defined as a mesh plane. A power generation density (kW per mesh plane) represents a power generation potential of the power generating device 113 installed in the mesh plane. The power generation density is predicted by estimating the power generation density at each time. The second predictor 111 may predict a future power generation amount in the management area for the relevant energy operation apparatus 110 instead of the power generation density.

The physical simulator 116 of the second predictor 111 performs the physical simulation and outputs a simulation result to a third predictor 117.

The third predictor 117 is provided as a functional part having the function of predicting the power generation amount in a management area for the relevant energy operation apparatus 10 according to the quality specified by the solution quality controller 36 based on necessary data and the power generation density predicted by the second predictor 111 in the management area. The quality signifies the stability of prediction corresponding to the value of the predictive solution target stabilization index supplied from the solution quality controller 36. The necessary data is selected from the demand data stored in the demand data storer 40, the weather data stored in the weather data storer 41, the observation data about each demand factor stored in the demand factor data storer 42, and the power generation state data stored in the power generation state data storer 115. The third predictor 117 includes a reference point adjustment processor 118, a regression model generator 119, and a regressive prediction processor 120. The reference point adjustment processor 118, the regression model generator 119, and the regressive prediction processor 120 are provided as functional parts that are implemented when the CPU 11 (FIG. 5) executes a corresponding program (unshown) stored in the external storage unit 13 (FIG. 5).

The reference point adjustment processor 118 is similar to the reference point adjustment processor 70 (FIG. 6) of the third predictor 33 (FIG. 6) according to the first embodiment. The reference point adjustment processor 118 determines a reference point and outputs a determination result to the regression model generator 119.

The regression model generator 119 maintains a table similar to the second table 73 (FIG. 8). The regression model generator 119 is similar to the regression model generator 71 (FIG. 6) according to the first embodiment. The regression model generator 119 generates a regression model between the power generation in a management area for the relevant energy operation apparatus 10 and the explanatory variable and outputs the generated regression model to the regressive prediction processor 120.

The regression model generator 71 acquires a value of the necessary explanatory variable from the weather data storer 41, the demand factor data storer 42, and a simulation result supplied from the physical simulator 116 of the second predictor 11. The regression model generator 71 applies the acquired value to the regression model supplied from the regression model generator 119 and calculates a predicted value for the power generation amount at the time slice (specified time) in the management area of the relevant energy operation apparatus 110. The regressive prediction processor 120 outputs the calculated predicted value for the power generation amount to the planner 121.

A planner 121 includes a controller 122 instead of the planning processor 101 (FIG. 6). The controller 122 performs feedback control or feedforward control from the power generating device 113. Specifically, the controller 122 receives feedback input of a power generation value from the power generating device 113. When the power generating device 113 is provided as a solar power generation device, the controller 122 changes the setup value of a power conditioner, changes the number of solar panels connected to the power conditioner, or disconnects the solar panels if the power generation is excessive in order to ensure an appropriate amount of power generation. When the power generating device 113 is provided as a thermal power generator, the controller 122 adjusts the opening of a steam governor or a fuel governor.

To control the power generating device 113, the controller 122 can use control logic, namely controls based on algorithms known as optimization control, PID (Proportional-Integral-Differential) control, model reference control, fuzzy control, and neural network.

The restriction relaxation process provides an allowable amount of control errors, namely chronological deviations between the power generation amount as a target and an actual power generation amount. The optimization control logic adjusts parameters so as to provide allowance optimization control that satisfies the maximum deviation. The PID control performs a process that increases parameters of a D coefficient for the PID control in response to a request for control based on a plan using the exact solution, namely control targeted at possibly minimizing the deviation. The control thereby promptly changes the power generation in order to always solve the deviation. The PID control performs a process that decreases parameters for the D coefficient and increases parameters for an I coefficient in response to a request for control based on a plan using a solution requiring the stability. The control result contains a deviation but allows the power generation to change moderately and improves the control stability.

As above, the energy operation apparatus 110 according to the present embodiment can provide effects comparable to those available from the energy operation apparatus 10 (FIG. 6) according to the first embodiment.

(3) Other Embodiments

There have been described the first and second embodiments that make no distinction in data for weather elements (weather data) and data for life activities (observation data for the demand factors) the energy operation apparatuses 10 and 110 use. However, the present invention is not limited thereto. In the energy operation system 1, for example, the higher-order energy operation apparatus 10 or 110 and the lower-order energy operation apparatus 10 or 110 may predict the energy demand by using weather data for meteorological computational grids corresponding to different altitudes and observation data for the demand factors at different spots. This makes it possible to prevent the energy operation apparatuses 10 and 110 from simultaneously erring in the prediction and allow the energy operation system 1 as a whole to perform the stable energy operation.

There have been described the first and second embodiments according to which the energy operation system 1 makes no distinction in weather data the energy operation apparatuses 10 and 110 use. Some energy operation apparatuses 10 and 110 are managed by a local electric power transmission company and have a role to solve a deviation between the supply and the demand of energy, others are managed by a power retailer and adjust the availability. However, the present invention is not limited thereto. The energy operation system may be configured to predict the energy demand so that the former energy operation apparatus 10 or 110 uses weather data for meteorological computational grids approximate to the upper atmosphere and the latter energy operation apparatus 10 or 110 uses weather data approximate to the ground level. Consequently, the former energy operation apparatus 10 or 110 can stably predict weather conditions all over a region. The latter energy operation apparatus 10 or 110 can truly keep track of increase and decrease in the demand from a large consumer and economically operate the power generator.

There has been described the first embodiment according to which the data assimilation processor 51 of the first data assimilator 52 of the first predictor 31 performs the data assimilation process emphasizing a reference point determined by the reference point adjustment processor 50. However, the present invention is not limited thereto. For example, the data assimilation processor 51 may determine spots indicating high energy demand densities in a management area and perform the above-described data assimilation process on these spots. This makes it possible to improve the precision of predicting or estimating values for weather elements such as temperature, solar radiation, humidity, wind speed, wind direction, and atmospheric pressure in a region in high demand for the energy and improve the precision of predicting the energy demand dependent on weather elements.

Similarly, in the above-described second embodiment, the data assimilation processor 51 of the first predictor 31 may determine spots indicating high power generation densities in the management area based on the prediction result from the second predictor 32 and may perform the above-described data assimilation process on these spots, for example. This makes it possible to improve the precision of predicting or estimating values for weather elements in a region corresponding to the high energy generation density and improve the precision of predicting the energy generation dependent on weather elements.

There have been described the first and second embodiments according to which the solution quality controller 36 specifies the quality of prediction solutions for the first through third predictors 31 through 33 by using only one numeric value (predictive solution target stabilization index). However, the present invention is not limited thereto. For example, the quality of prediction solutions may be divided into a plurality of items such as stability, exactness, trueness, an equation solving speed, a temporal granularity of solutions, and a spatial granularity of solutions. The solution quality controller 36 may specify the quality corresponding to each item for the first through third predictors 31 through 33. The first through third predictors 31 through 33 may calculate prediction solutions so as to find a prediction solution corresponding to the quality specified for each item.

There has been described the first embodiment that controls the solution quality of prediction solutions for the first through third predictors 31 through 33 based on the weather condition and the energy demand density condition in a management area for the energy operation apparatus 10. There has been described the second embodiment that controls the solution quality of prediction solutions for the first through third predictors 31, 111, and 117 based on the weather condition and the power generation density condition in a management area for the energy operation apparatus 110. However, the present invention is not limited thereto. The configurations of the first and second embodiments may be combined to control the solution quality of prediction solutions for the first through third predictors based on three conditions such as the weather condition, the energy demand density condition, and the power generation density condition in a management area for the energy operation apparatus.

The present invention is widely applicable to various energy operation systems including a plurality of energy operation apparatuses each of which predicts the supply and/or demand of energy in a management area and operates the energy in the management area based on a prediction result.

What is claimed is:

1. An energy operation apparatus that operates energy in a management area based on a prediction result for at least one of supply and demand for the energy in the management area, comprising:
   a demand predictor that predicts at least one of a future demand and power generation amount of the energy in the management area;
   a planner that prepares a future energy supply plan in the management area based on a prediction result from the demand predictor;
   an evaluator that evaluates supply and/or demand conditions including at least one of future weather in the management area, energy demand in the management area, and at least one of a future energy demand density and generation density in the management area;
   a solution quality controller that controls the quality of at least one of a prediction solution of the demand predictor and the energy supply plan of the planner based on an evaluation result from the evaluator; and
   a demand density predictor that predicts at least one of a future demand density and generation density of the energy in the management area,
      wherein the demand predictor predicts at least one of a future demand and power generation amount of the energy in the management area based on a prediction result from the demand density predictor, and
      wherein the evaluator evaluates supply and/or demand conditions including a prediction result from the demand density predictor in the management area.

2. The energy operation apparatus according to claim 1, further comprising a weather predictor that predicts future weather in the management area,
   wherein the evaluator evaluates the supply and/or demand conditions including a prediction result from the weather predictor in the management area.

3. The energy operation apparatus according to claim 2, wherein the weather predictor includes:
   a first data assimilator that performs data assimilation between observation data of a past weather element in the management area and a prediction result for the weather; and
   a second data assimilator that performs data assimilation between observation data of a present weather element in the management area and a prediction result for the weather.

4. The energy operation apparatus according to claim 3, wherein the first assimilator determines a spot corresponding to at least one of a high demand density and generation density of the energy in the management area based on a prediction result from the demand density predictor and performs data assimilation between a prediction result of the weather for the spot and observation data of the weather element at the spot.

5. The energy operation apparatus according to claim 1, wherein the evaluator evaluates a prediction result from the weather predictor and the demand density predictor based on a dispersion state of at least one of temporal and spatial data.

6. The energy operation apparatus according to claim 1, wherein the solution quality controller controls quality of at least one of the prediction solution for the demand predictor and the energy supply plan of the planner in accordance with at least one of the energy supply plan of the planner and a prediction solution of the demand predictor specified by one of the energy operation apparatus and a user.

7. An energy operation method performed in an energy operation apparatus that performs an operation of the energy in a management area based on a prediction result for at least one of supply and demand for energy in the management area, the method comprising:
a first step of predicting at least one of future demand and power generation amount of the energy in the management area; and
a second step of preparing a future energy supply plan in the management area based on a prediction result for at least one of demand and power generation amount of the energy,
wherein the first step includes:
an evaluation step that evaluates supply and/or demand conditions including at least one of future weather in the management area, energy demand in the management area, and at least one of a future energy demand density and generation density in the management area; and
a solution quality control step that controls the quality of at least one of a prediction solution and the energy supply plan of at least one of a demand and power generation amount of the energy based on an evaluation result from an evaluation step,
wherein the first step moreover predicts at least one of a future demand density and generation density of the energy in the management area,
predicts at least one of a future demand and power generation amount of the energy in the management area based on a prediction result for at least one of a demand density and generation density of the energy, and
evaluates the supply and/or demand conditions including a prediction result for at least one of a demand and power generation amount of the energy in the management area.

8. The energy operation method according to claim 7, wherein the first step predicts future weather in the management area and evaluates the supply and/or demand conditions including a prediction result for the weather in the management area.

9. The energy operation method according to claim 8, wherein the first step predicts future weather in the management area while performing data assimilation between observation data of a past weather element in the management area and a prediction result for the weather and performing data assimilation between observation data of a present weather element in the management area and a prediction result for the weather.

10. The energy operation method according to claim 9, wherein data assimilation between observation data of a past weather element in the management area and a prediction result for the weather determines a spot corresponding to at least one of a high demand density and generation density of the energy in the management area based on a prediction result for at least one of demand density and generation density of the energy and performs data assimilation between a prediction result of the weather for the spot and observation data of the weather element at the spot.

11. An energy operation system comprised of a plurality of energy operation apparatuses each of which predicts at least one of supply and demand for energy in a management area and operates the energy in the management area based on a prediction result,
wherein each of the energy operation apparatuses includes:
a demand predictor that predicts at least one of a future demand and power generation amount of the energy in the management area;
a planner that prepares a future energy supply plan in the management area based on a prediction result from the demand predictor;
an evaluator that evaluates supply and/or demand conditions including at least one of future weather in the management area, energy demand in the management area, and at least one of a future energy demand density and generation density in the management area;
a solution quality controller that controls the quality of at least one of a prediction solution of the demand predictor and the energy supply plan of the planner based on an evaluation result from the evaluator;
a weather predictor that predicts future weather in the management area; and
a demand density predictor that predicts at least one of a future demand density and generation density of the energy in the management area,
wherein the demand predictor predicts at least one of a future demand and power generation amount of the energy in the management area based on a prediction result from the demand density predictor,
wherein the evaluator evaluates supply and/or demand conditions including at least one of a prediction result from the weather predictor and a prediction result from the demand density predictor in the management area,
wherein the weather predictor of the higher-order energy operation apparatus and the weather predictor of the lower-order energy operation apparatus each predict the weather in the management area based on data of different weather elements, and
wherein the demand density predictor of the higher-order energy operation apparatus and the demand density predictor of the lower-order energy operation apparatus each predict at least one of a demand density and generation density of the energy in the management area based on data at different spots.

12. The energy operation system according to claim 11, wherein the weather predictor of the higher-order energy operation apparatus predicts weather in the management area based on observation data of a weather element in an upper atmosphere; and
wherein the weather predictor of the lower-order energy operation apparatus predicts weather in the management area based on observation data of a weather element near a ground level.

* * * * *